US012485892B2

(12) United States Patent
Lee

(10) Patent No.: US 12,485,892 B2
(45) Date of Patent: Dec. 2, 2025

(54) METHOD FOR DISPLAYING LANE INFORMATION AND APPARATUS FOR EXECUTING THE METHOD

(71) Applicant: THINKWARE CORPORATION, Seongnam-si (KR)

(72) Inventor: Han Woo Lee, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 507 days.

(21) Appl. No.: 17/979,893

(22) Filed: Nov. 3, 2022

(65) Prior Publication Data

US 2023/0048230 A1    Feb. 16, 2023

Related U.S. Application Data

(63) Continuation of application No. 16/704,595, filed on Dec. 5, 2019, now Pat. No. 11,518,384.

(30) Foreign Application Priority Data

Dec. 7, 2018  (KR) .................. 10-2018-0156653
Nov. 22, 2019 (KR) .................. 10-2019-0151348

(51) Int. Cl.
*B60W 30/12* (2020.01)
*B60W 30/10* (2006.01)
(Continued)

(52) U.S. Cl.
CPC ............ *B60W 30/12* (2013.01); *B60W 30/10* (2013.01); *B60W 30/18163* (2013.01);
(Continued)

(58) Field of Classification Search
CPC .......... B60W 30/12; B60W 30/18163; B60W 2552/53
(Continued)

(56) References Cited

U.S. PATENT DOCUMENTS 7,460,161 B2    12/2008  Pallaro et al.
7,561,032 B2 *  7/2009  Huang .................. B60Q 9/008
                                                        340/436
(Continued)

FOREIGN PATENT DOCUMENTS

CN    103262139 A    8/2013
CN    104376297 A    2/2015
(Continued)

OTHER PUBLICATIONS

Office Action dated Sep. 2, 2022, issued in counterpart CN application No. 201911241095.5 with English translation. (21 pages).
(Continued)

*Primary Examiner* — Phutthiwat Wongwian
*Assistant Examiner* — Brian R Kirby
(74) *Attorney, Agent, or Firm* — WHDA, LLP

(57) ABSTRACT

The present disclosure relates to a method for displaying lane information of an electronic device. The method for displaying lane information according to the present disclosure includes: acquiring an image photographed while a vehicle is driving; dividing the acquired image according to a distance from the vehicle; detecting lane display lines in the divided areas; curve-fitting the detected lane display lines to a continuous curve; and displaying the curve-fitted curve on a predetermined user interface. According to the present disclosure, it is possible to improve the route visibility to the driver by recognizing the far-distance lane by determining whether the vehicle is in the driving lane. In addition, it is possible to more accurately provide the route guidance information by using the real-time lane recognition results for the display of the route guidance.

12 Claims, 16 Drawing Sheets

(51) Int. Cl.
*B60W 30/18* (2012.01)
*B60W 50/12* (2012.01)
*B62D 15/02* (2006.01)
*G06V 20/56* (2022.01)
*G08G 1/16* (2006.01)

(52) U.S. Cl.
CPC .......... *B60W 50/12* (2013.01); *B62D 15/025* (2013.01); *G06V 20/588* (2022.01); *G08G 1/167* (2013.01); *B60W 2420/403* (2013.01)

(58) Field of Classification Search
USPC ..................................................... 701/23, 41
See application file for complete search history.

(56) References Cited

U.S. PATENT DOCUMENTS

| | | | | |
|---|---|---|---|---|
| 8,457,868 | B2 * | 6/2013 | Tange | B60T 8/17557 |
| | | | | 701/41 |
| 9,014,904 | B2 | 4/2015 | Higgins-Luthman | |
| 9,443,313 | B2 | 9/2016 | Muramatsu et al. | |
| 2002/0095246 | A1 * | 7/2002 | Kawazoe | B62D 15/025 |
| | | | | 348/148 |
| 2003/0103649 | A1 | 6/2003 | Shimakage | |
| 2006/0015252 | A1 | 1/2006 | Yamamoto et al. | |
| 2007/0069874 | A1 * | 3/2007 | Huang | B62D 15/029 |
| | | | | 340/435 |
| 2008/0024284 | A1 * | 1/2008 | Baratoff | G08G 1/161 |
| | | | | 340/435 |
| 2009/0167864 | A1 * | 7/2009 | Unoura | G06T 7/12 |
| | | | | 348/148 |
| 2009/0262188 | A1 | 10/2009 | Hoki | |
| 2010/0268452 | A1 | 10/2010 | Kindo et al. | |
| 2012/0221168 | A1 * | 8/2012 | Zeng | B60W 60/0018 |
| | | | | 701/1 |
| 2013/0027195 | A1 * | 1/2013 | Van Wiemeersch | G08G 1/167 |
| | | | | 340/431 |
| 2013/0028473 | A1 | 1/2013 | Hilldore et al. | |
| 2013/0177205 | A1 | 7/2013 | Kasaoki | |
| 2015/0070501 | A1 * | 3/2015 | Ooi | B60R 21/00 |
| | | | | 348/148 |
| 2017/0148327 | A1 * | 5/2017 | Sim | G08G 1/167 |
| 2018/0040676 | A1 | 2/2018 | Hack et al. | |
| 2018/0046867 | A1 | 2/2018 | Yang | |
| 2018/0178785 | A1 * | 6/2018 | Lin | G06V 10/754 |
| 2018/0247138 | A1 * | 8/2018 | Kang | G08G 1/165 |
| 2018/0362083 | A1 | 12/2018 | Su et al. | |
| 2018/0370567 | A1 * | 12/2018 | Rowell | G06T 19/006 |
| 2019/0042860 | A1 | 2/2019 | Lee et al. | |
| 2019/0061752 | A1 | 2/2019 | Wang et al. | |
| 2020/0026282 | A1 | 1/2020 | Choe et al. | |
| 2020/0047752 | A1 | 2/2020 | Ivanovic et al. | |
| 2020/0302189 | A1 | 9/2020 | Shu | |
| 2020/0307576 | A1 | 10/2020 | Takegawa | |
| 2020/0310452 | A1 | 10/2020 | Oyama | |
| 2021/0389153 | A1 * | 12/2021 | Zhen | B60W 30/12 |
| 2022/0363251 | A1 * | 11/2022 | Shin | G06V 20/58 |

FOREIGN PATENT DOCUMENTS

| | | | | |
|---|---|---|---|---|
| CN | 107563326 A | | 1/2018 | |
| JP | 08172620 A | | 7/1996 | |
| KR | 20140024681 A | * | 3/2014 | ........... G06V 20/588 |
| KR | 101391608 B1 | * | 5/2014 | ........... G06V 20/588 |
| KR | 10-2016-0064275 A | | 6/2016 | |
| KR | 10-2018-0090610 A | | 8/2018 | |
| KR | 10-2018-0099280 A | | 9/2018 | |
| WO | WO-2021065735 A1 | * | 4/2021 | ............. B60K 35/81 |

OTHER PUBLICATIONS

Office Action dated Apr. 15, 2023, issued in counterpart CN application No. 201911241095.5 with English translation. (22 pages).

Office Action dated May 31, 2024, issued in counterpart KR application No. 10-2019-0151348 with English translation. (13 pages).

Written Decision on Registration dated Feb. 4, 2025, issued in counterpart Korean patent application No. 10-2019-0151348 with English translation (3 pages).

* cited by examiner

METHOD FOR DISPLAYING LANE INFORMATION AND APPARATUS FOR EXECUTING THE METHOD

CROSS-REFERENCE TO RELATED APPLICATION

This application is a continuation of U.S. patent application Ser. No. 16/704,595 filed on Dec. 5, 2019, which claims the priority and benefit of Korean Patent Application No. 10-2018-0156653 filed on Dec. 7, 2018, and 10-2019-0151348, filed on Nov. 22, 2019, with the Korean Intellectual Property Office, the disclosure of which is incorporated herein by reference.

BACKGROUND OF THE INVENTION

Field of the Invention

The present disclosure relates to a method for displaying lane information of an electronic device and an electronic device.

Description of the Related Art

With the opening of the Internet network and the revision of laws related to location data, location based service (LBS) related industries are being activated. Representative devices using such a location based service may include a vehicle navigation device that provides a route guidance service for guiding a moving route to a destination by positioning a current location of a vehicle and the like.

In addition, objective data may be increasingly needed to determine an error rate according to the responsibility for accidents that occurred during the stopping or driving of the vehicle. Therefore, a video recorder for a vehicle capable of providing the objective data has been used.

A lane departure warning is to warn a driver of a lane departure to protect the driver from a lane departure accident caused by carelessness of a driver, drowsy driving, and the like. In order to increase the accuracy of the lane departure warning, there is a need to recognize the correct lane, but the recognition of the current lane is dependent on an electronic map, so the accuracy of the warning may be problematic due to a difference between a actual driving lane and map information.

Therefore, the current lane departure warning services are limited in the range of applications since they are mainly implemented to operate only at a short-distance straight line and a specific speed or more for simple lane recognition, and perform lane recognition only when there is no car in front of a driving lane in the case of a curved section.

SUMMARY OF THE INVENTION

The present disclosure provides an electronic device that support safe driving of a driver on the assumption of accurate lane recognition and a method for warning a lane departure of the electronic device.

According to the present disclosure, a method for displaying lane information includes: acquiring an image photographed while a vehicle is driving; dividing the acquired image according to a distance from the vehicle; detecting lane display lines in the divided image; curve-fitting the detected lane display lines to a continuous curve; and displaying the curve-fitted curve on a predetermined user interface.

In the dividing, the input image may be divided based on a resolution determined according to the distance from the vehicle.

In the dividing, a lower area of the acquired image may be divided into at least two areas based on a vanishing point in the image or a front vehicle, and a short-distance area from the vehicle among the at least two areas may be generated as a first partial image, and in the detecting, the lane display line may be detected in the first partial image.

In the dividing, a second partial image including an area farther than the first partial image may be generated, and in the detecting, the lane display line may be detected in the second partial image.

In the detecting, it may be determined whether there is a driving vehicle in the divided image, and a lane of a road on which there is no driving vehicle may be detected.

In the curve-fitting, the detected lane display lines may be curve-fitted according to the detected lane display line and whether there is the driving vehicle.

In the displaying, a driving route of the vehicle may be displayed on the curve-fitted curve.

According to the present disclosure, a method for guiding a lane departure includes: acquiring an image photographed while a vehicle is driving; dividing the acquired image according to a distance from the vehicle to detect lane display lines in the divided image; recognizing a lane of a road on which the vehicle is driving by curve-fitting the detected lane display lines to a continuous curve; and determining whether the vehicle is out of the lane according to the recognized lane of the road.

The method for guiding a lane departure may further include: displaying the curve-fitted curve on a predetermined user interface.

In the displaying, the lane departure determined may be displayed on the user interface.

In the determining, a threshold value for determining whether the vehicle is out of the lane may be controlled in consideration of a curve cutting behavior of the cut-fitted curve.

According to the present disclosure, an electronic device includes: an image acquisition unit configured to acquire an image photographed while a vehicle is driving; an image division unit configured to divide the acquired image according to a distance from the vehicle; a lane detection unit configured to detect lane display lines in the divided image; a curve fitting unit configured to curve-fit the detected lane display lines to a continuous curve; and a display unit configured to display the curve-fitted curve on a predetermined user interface.

The image division unit may divide the input image based on a resolution determined according to the distance from the vehicle.

The image division unit may divide a lower area of the acquired image into at least two areas based on a vanishing point in the image or a front vehicle, and generate a short-distance area from the vehicle among the at least two areas as a first partial image, and the lane detection unit may detect a lane display line in the first partial image.

The image division unit may generate a second partial image including an area farther than the first partial image, and the lane detection unit may detect a lane display line in the second partial image.

The lane detection unit may detect whether there is a driving vehicle in the divided image and detect a lane display line of a road on which there is no driving vehicle.

The curve fitting unit may curve-fit the detected lane display line according to the detected lane display line and whether there is the driving vehicle.

The display unit may display the driving route of the vehicle on the curve-fitted curve.

Technical solutions of the present disclosure are not limited to the abovementioned solutions, and solutions that are not mentioned will be clearly understood by those skilled in the art to which the present disclosure pertains from the present specification and the accompanying drawings.

According to the present disclosure, it is possible to improve the route visibility to the driver by recognizing the long-distance lane by determining whether the vehicle is in the driving lane. In addition, it is possible to more accurately provide the route guidance information by using the real-time lane recognition results for the display of the route guidance through the augmented reality (AR).

In addition, it is possible to increase the speed and accuracy of the lane detection by determining whether the vehicle is in the driving lane and flexibly detecting the lane to the long distance.

In addition, it is possible to detect and use the finer curve by dividing the area in the image in which the lane exists by changing the resolutions according to distance.

BRIEF DESCRIPTION OF THE DRAWING FIGURES

DETAILED DESCRIPTION OF THE EXEMPLARY EMBODIMENTS

Figure 1:
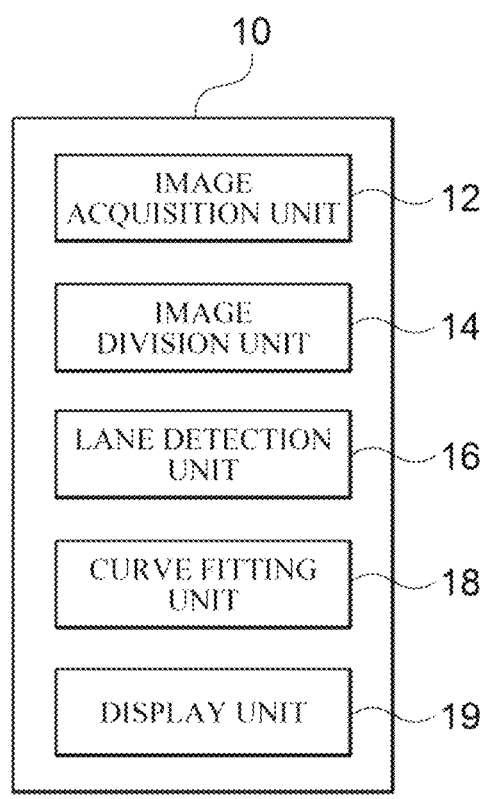
FIG. 1 is a block diagram illustrating an electronic device for performing a method for displaying lane information according to an embodiment of the present disclosure.

The following description illustrates only a principle of the present disclosure. Therefore, those skilled in the art may implement the principle of the present disclosure and invent various devices included in the spirit and scope of the present disclosure although not clearly described or shown in the present specification. In addition, it is to be understood that all conditional terms and exemplary embodiments mentioned in the present specification are obviously intended only to allow those skilled in the art to understand a concept of the present disclosure in principle, and the present disclosure is not limited to exemplary embodiments and states particularly mentioned as such.

The above-mentioned objects, features, and advantages will become more obvious from the following detailed description provided in relation to the accompanying drawings. Therefore, those skilled in the art to which the present disclosure pertains may easily practice a technical idea of the present disclosure.

Further, in describing the present disclosure, in the case in which it is judged that a detailed description of a well-known technology associated with the present disclosure may unnecessarily make the gist of the present disclosure unclear, it will be omitted. Hereinafter, exemplary embodiments of the present disclosure will be described in detail with reference to the accompanying drawings.

The above-mentioned objects, features, and advantages will become more obvious from the following detailed description provided in relation to the accompanying drawings. However, the present disclosure may be variously modified and have several embodiments. Therefore, specific embodiments of the present disclosure will be illustrated in the accompanying drawings and be described in detail. In principle, same reference numerals denote same constituent elements throughout the specification. In addition, when it is decided that a detailed description for the known function or configuration related to the present disclosure may obscure the gist of the present disclosure, the detailed description therefor will be omitted.

Hereinafter, configurations of an electronic device and a server according to an embodiment of the present disclosure will be described in more detail with reference to the accompanying drawings. In addition, terms "module" and "unit" for components used in the following description are used only to easily make the disclosure. Therefore, these terms do not have meanings or roles that distinguish from each other in themselves.

An electronic device described herein may include a mobile phone, a smart phone, a notebook computer, a digital broadcasting terminal, personal digital assistants (PDA), a portable multi-media player (PMP), a navigation terminal, and the like. Hereinafter, for convenience of explanation, it is assumed that the electronic device is a navigation terminal.

A traffic related image is a traffic image collected from a user device and other devices (for example, CCTV and the like), and may be image data that include a still image and a moving image including road congestion information, road surface state information, accident information, notice information, and the like.

Hereinafter, the present disclosure will be described in detail with reference to the accompanying drawings.

An electronic device 10 according to an embodiment of the present disclosure will be described with reference to FIG. 1.

FIG. 1 is a block configuration diagram of an electronic device 10 according to an embodiment of the present disclosure.

In the present embodiment, the electronic device 10 may include an image acquisition unit 12, an image division unit 14, a lane detection unit 16, a curve fitting unit 18, and a display unit 19.

The image acquisition unit 12 acquires a photographed image while a vehicle is driving.

The image acquisition unit 12 may acquire a front image directly photographed by a camera module. Alternatively, an image related to driving of a vehicle may be directly received from at least one external camera (not shown). For example, when the electronic device 10 operates as a vehicle navigation apparatus, the image acquisition unit 12 may receive and acquire an image photographed by a video recorder apparatus for a vehicle.

That is, the image acquisition unit 12 can directly photograph and acquire an image or receive and acquire an image photographed by other external devices.

The image division unit 14 divides the acquired image according to the distance from the vehicle.

In the present embodiment, since the electronic device 10 divides an image into a plurality of partial images to recognize a lane in the image, the image division unit 14 divides the acquired image according to a predetermined criterion.

In this case, the division of the image may be performed using a fixed reference or a dynamic reference by referring to object information such as a vehicle recognized in the image.

This will be described in more detail with reference to FIG. 3.

First, a method for using a fixed criterion according to an image division method will be described.

Figure 3:
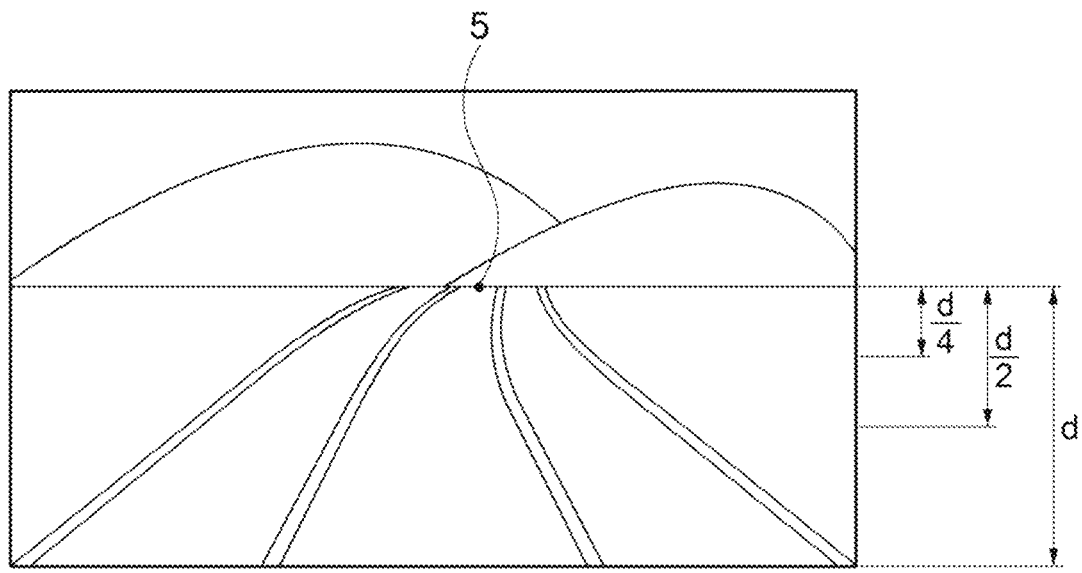
FIGS. 3 to 6 are exemplary views illustrating an example of image division in the method for displaying lane information according to the embodiment of the present disclosure.

Referring to FIG. 3, the image division unit 14 may extract a vanishing point 5 of the acquired image and may divide an image based on the current location of the vehicle and the distance to the vanishing point 5 based on the vanishing point 5.

The image division unit 14 may first recognize a ground area in the image. The image division unit 14 may recognize a horizon in the image by using the vanishing point 5 of the lanes of the image, and recognize the following area as the ground area based on the horizon. In this case, the image division unit 14 may divide the recognized ground area into a plurality of partial images according to the distance.

For example, when the distance to the vanishing point 5 is d, an image from a lower end of the image which is the current location of the vehicle to point d/2 may be divided into a first partial image.

In addition, the image from the remaining image to the vanishing point 5 may be divided into a second partial image, and the second partial image can be divided into a third partial image based on a distance d/4.

That is, in the present embodiment, the image division unit 14 may divide the image to the vanishing point 5 into a plurality of images and detect a lane display line from the divided images.

In another embodiment, the image division unit 14 may dynamically divide an image.

For example, a distance to a location where a front vehicle 8 exists based on a current driving lane of a vehicle may be used as a reference for dividing an image.

Figure 4:
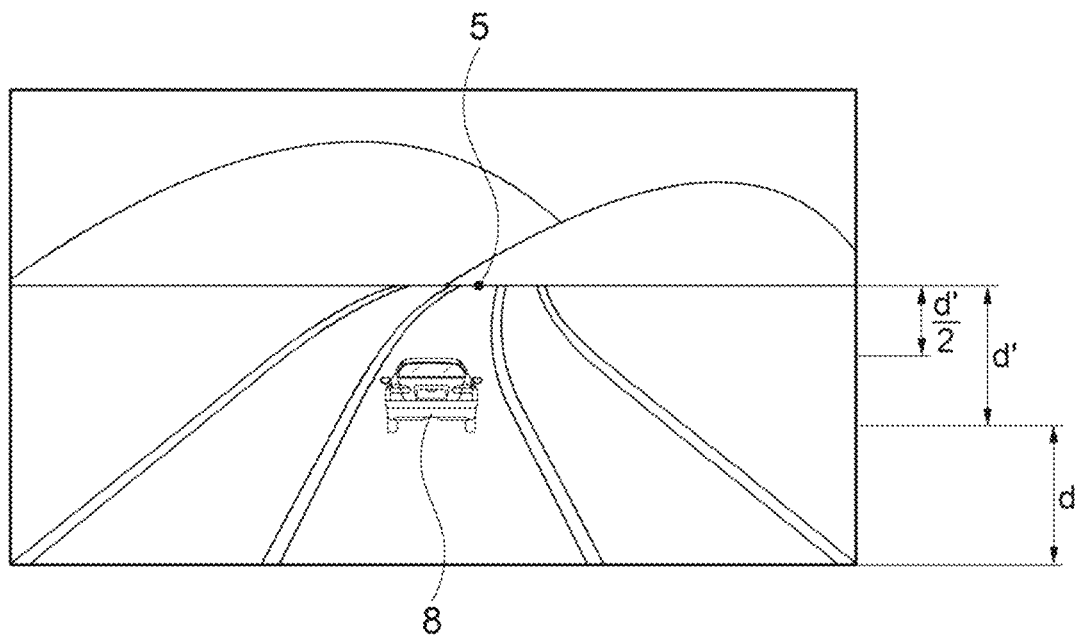

Referring to FIG. 4, the image division unit 14 may extract the front vehicle 8 from the acquired image and divide the image based on the front vehicle 8 in the driving lane.

That is, the image may be divided into the first partial image up to a distance d at which the front vehicle 8 is located.

In this case, the remaining images may be divided into the second partial image corresponding to a distance d' to the vanishing point 5. Alternatively, the image may be further divided into a third partial image d'/2 based on the second partial image d'.

That is, in the present embodiment, since the division criterion of the original first partial image uses the location of the front vehicle 8, the criterion may be changed dynamically, and the lane may be recognized later through additional image processing.

In another embodiment, it is also possible to use only the location of the front vehicle as a reference for the division of the image.

Figure 5A:
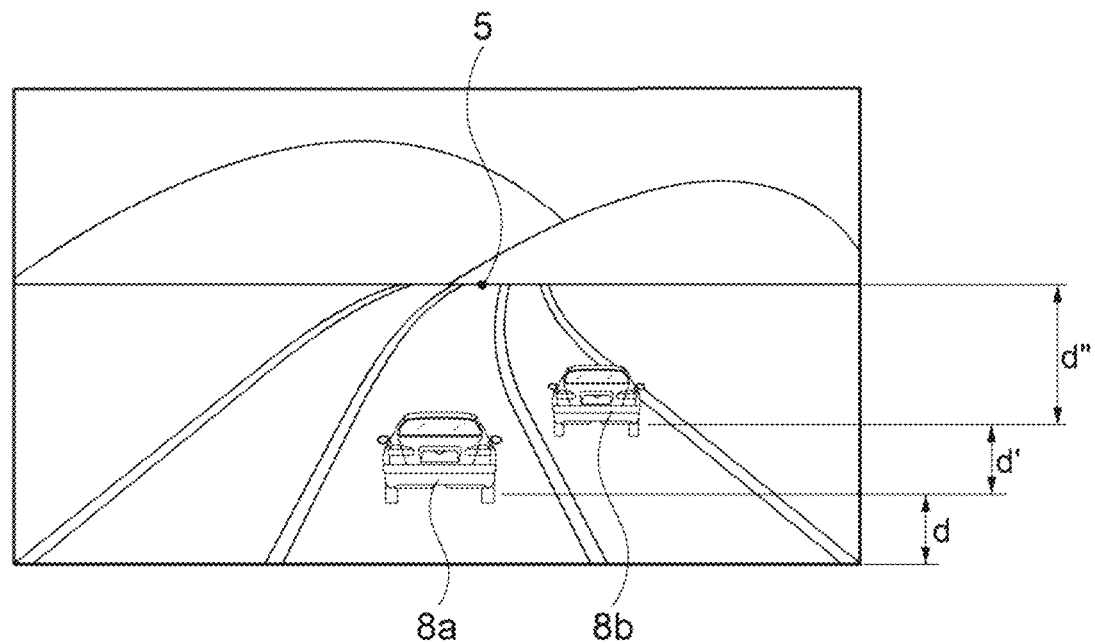

Referring to FIG. 5A, in this embodiment, the image division unit 14 can acquire locations of front vehicles 8a and 8b as objects included in the acquired image, and divide an image from a close distance based on the locations of the front vehicles.

Accordingly, the image division unit 14 may divide the image into the first partial image corresponding to the distance d to the front vehicle 8a of the driving lane, the second partial image corresponding to the distance d' to the front vehicle 8b located at the current lane or the next lane in the remaining images, and the third partial image corresponding to the distance d" to the vanishing point 5.

In the above-described embodiment of the present disclosure, the image division unit 14 may divide the image according to a predetermined distance based on the vanishing point or divide the image based on the location of the front vehicle as an object included in the image.

In addition, when there is no front vehicle in the image, the image can be divided according to the predetermined distance, and when the front vehicle exists in the image, the image can be divided according to the distance to the front vehicle.

Figure 5B:
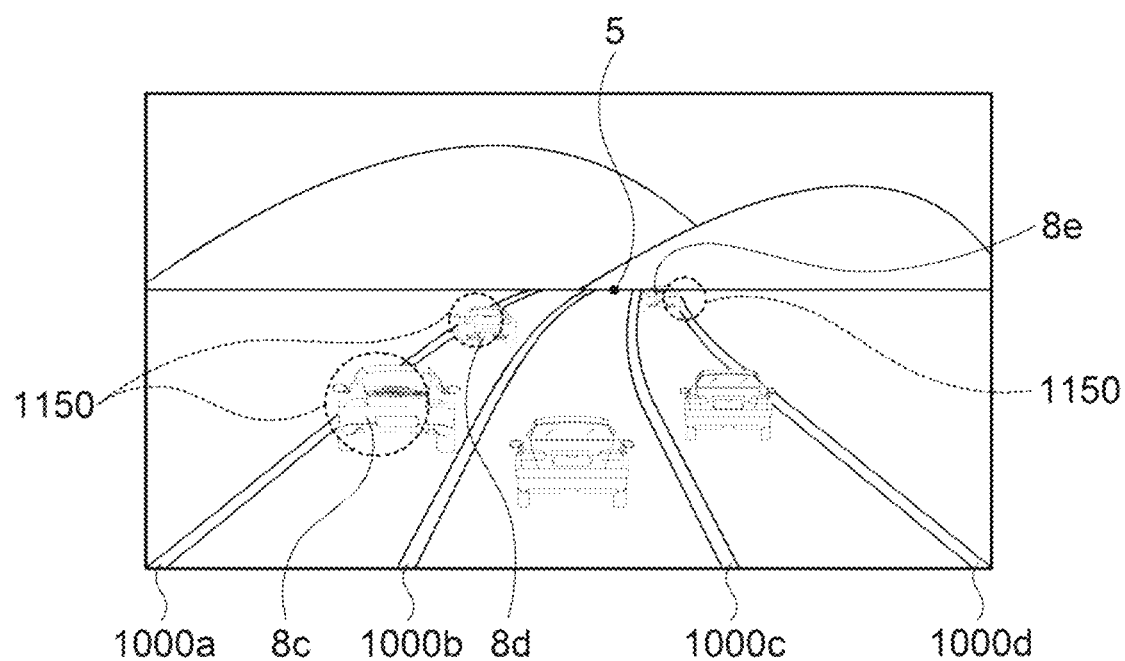

However, referring to FIG. 5B, in the present embodiment, lanes 1000a, 1000b, 1000c, and 1000d in the image may be partially covered according to the locations of the front vehicles 8c, 8d, and 8e as an object included in the acquired image.

In detail, in the case of FIG. 5B, two lane display lines 1000a, and 1000d may be partially covered by a vehicle driving ahead.

Accordingly, an area 1150 that is covered for accurate guidance using a lane may be interpolated using peripheral information of lanes in the image, which will be described below in more detail in the curve fitting unit 18. The lane detection unit 16 detects a lane display line in the divided image.

The lane detection unit 16 may recognize a lane display line displayed on a road from the driving image of the vehicle using various filtering algorithms.

For example, the lane detection unit 16 may extract a lane display line for dividing a lane from an image by using an edge filter. In the case of using the edge filter, the lane detection unit 16 searches for a boundary portion of the image by using brightness values of each pixel included in the image. Then, the lane display line is recognized based on the searched boundary portion.

Meanwhile, the edge filter is an example of a method for recognizing a lane display line, and the lane detection unit 16 disclosed in this document may extract the lane display line included in the image using various filtering algorithms in addition to the method using the edge filter.

When the lane display line is extracted, the lane detection unit 16 may acquire a display form of lane display lines such as a straight line, a curve, a solid line, and a dotted line based on an extracted outline of the lane display line. In addition, the lane detection unit 16 may acquire color information of the lane display line through color recognition of the extracted lane display line.

The lane detection unit 16 may detect each lane display line for the plurality of divided images as described above.

In addition, when the plurality of lane display lines are extracted from the second or third partial image, the lane detection unit 16 may recognize at least one lane display line corresponding to the lane in which the vehicle is driving among the plurality of lane display lines.

Here, the lane detection unit 16 may use the display location in the image of each lane display line extracted from the image to select the lane display line corresponding to the lane in which the vehicle is driving among the lane display lines included in the image.

For example, when the plurality of lane display lines are detected from the image, the lane detector 16 may set a reference line that vertically crosses the image, and may select the lane display line corresponding to the lane in which the vehicle is driving based on the distance between the reference line and each lane display line.

That is, the lane display line close to the reference line may be selected as the lane display line associated with the lane in which the vehicle is driving. In addition, the lane detecting unit 16 may distinguish a left display line and a right display line of the lane in which the vehicle is driving depending on where the lane display line is located relative to the reference line.

Through the above process, the lane detection unit 16 may accurately recognize the lane in which the vehicle is driving among the detected lanes.

The curve fitting unit 18 curve-fits the detected lane display line to a continuous curve. Specifically, the curve fitting unit 18 curve-fits the lane display line in which the vehicle is driving among the plurality of lanes to the continuous curve.

The curve fitting used in the present specification is a type of data fitting, and may construct a curve according to a slope between two sequential points on the detected lane display line. Therefore, in the curve fitting of the present specification, the "curve" may include "straight line" as a reference that is curve-fitted as an expression of a representative meaning. For example, when the detected lane display line is divided into a plurality of sections and a difference in a slope between a start point and an end point of the divided sections is 0, the detected lane display line will be implemented as a straight line, and when there is a slope between the two points, the curve will be constructed according to the slope. Therefore, although expressed as the "curve fitting" in this specification, the present disclosure should not be construed as limited to this expression.

In the present embodiment, since the lane detection unit 16 detects lanes individually for each image, when the detected lane display lines are combined as they are, a part of the detected lines may be displayed while being displaced or broken. Accordingly, the curve fitting unit 18 may curve-fit the lanes to the reference curve in order to provide the detected lane display lines to a user in a continuous form.

In this case, the curve which is a reference of the curve fitting may be calculated based on the acquired image or may be generated through link information received through external data.

For example, the starting point and the ending point of the lane may be recognized based on the acquired image, and may be curve-fitted so that the detected lane display lines are continued in succession. A reference curve to approximate can be generated and curve-fitted in consideration of the curvature and distance of each detected lane display line.

Alternatively, the curvature of the road corresponding to the driving location may be received through external map data and the like in consideration of the current driving location of the vehicle, and the detected lane display line may be curve-fitted to a curve depending on the curvature value of the corresponding road.

In addition, as shown in FIG. 5B, the situation in which a part of the lane is covered by a vehicle located in the lane may occur in the present embodiment.

In the present embodiment, the lane of the long distance is recognized and curve-fitted to a continuous curve, and since the lanes of the far lane may be covered by the vehicle, separate processing may be required.

In detail, the curve fitting unit 18 may interpolate a portion covered by the vehicle among the detected lane display lines using other lane information not covered by the vehicle.

To this end, the curve fitting unit 18 may extract reference information for the interpolation in the image.

Figure 8A:
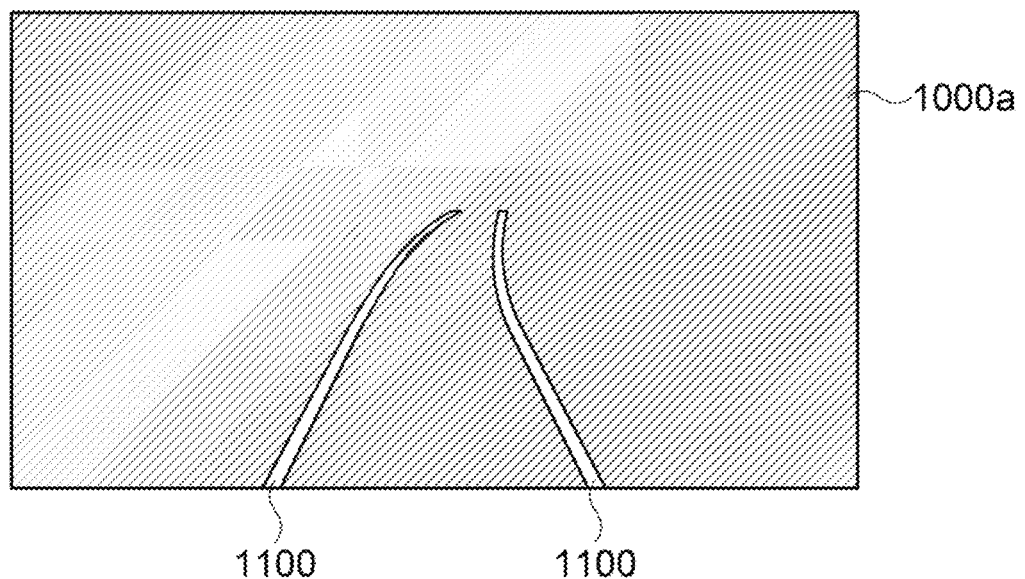
Figure 8B:
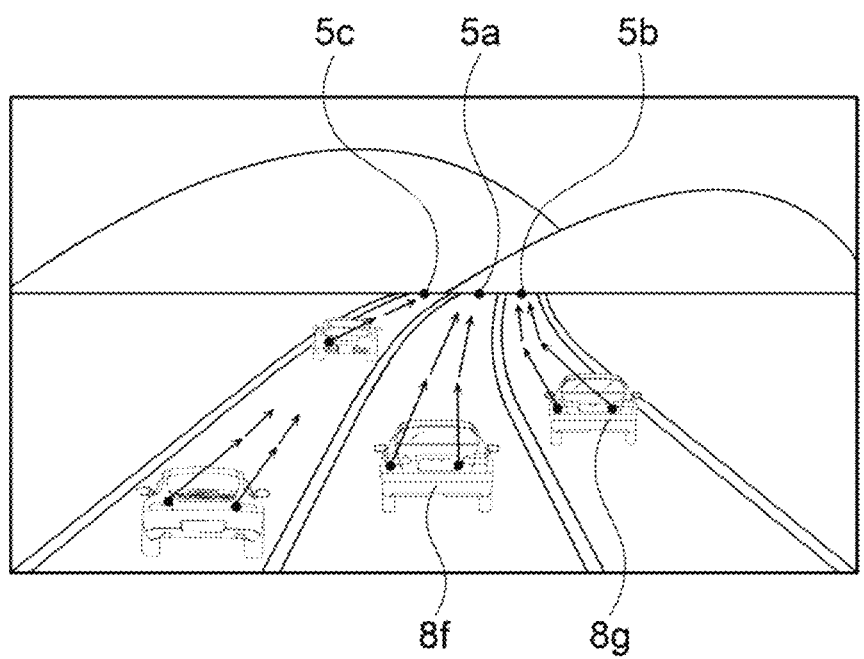

Referring to FIG. 8B, a center point of the road may be extracted as the first criterion for the curve fitting. The example in which, the distance is divided based on the vanishing point is described, but the center point of the road may be extracted for the interpolation of the lane.

In more detail, the center point of the road may be extracted using movement information of vehicles 8f and 8g driving each road.

The movement information of the vehicle may be determined using feature points of the vehicle. The feature points may be extracted from sequentially input images, and a movement trend of the feature points may be generated as an optical flow.

The generated optical flow can be defined as a vector having a magnitude and a direction, and the vector can converge toward a particular point. In general, since the driving vehicle is continuously driving toward the center of the road, the vectors for the feature points of the vehicle may also be generated toward the center point of the road. Therefore, in the present embodiment, the points where the vectors converge as the movement trend of each feature point can be extracted as the center points 5a, 5b, and 5c of the road.

Next, the curve fitting unit 18 may additionally use other lane information as a second criterion along with the center point of the road.

Hereinafter, the specific operation of the curve fitting unit 18 will be described in more detail with reference to FIG. 8C.

Figure 8C:
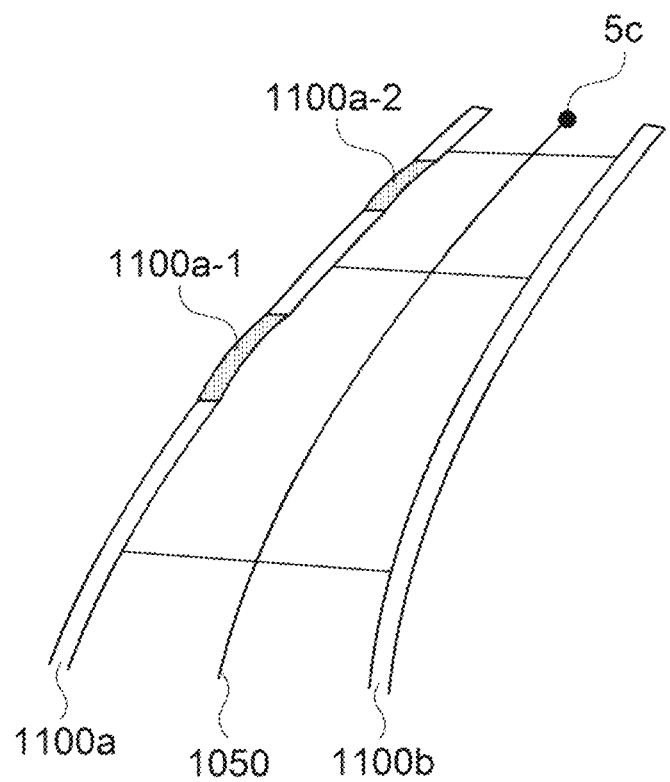

When the road curves to the right as shown in FIG. 8C, the situation in which the left lane is covered by the vehicle may occur. That is, two areas of the lane 1100a located on the left side may be covered by two vehicles driving ahead, and thus the lane may not be detected by the lane detection unit 16.

In this case, the curve fitting unit 18 may interpolate the area where the lane is not detected based on the uncovered opposite lane 1100b.

That is, the curve fitting unit 18 uses the center point 5c of the road extracted by the optical flow in the above-described example and the lane 1100b which is not covered among the two lanes for interpolation.

The lane 1100b and the opposite lane 1100a which are not covered in the general road structure may be assumed to be located at the same distance based on the center point 5c of the road.

Accordingly, the curve fitting unit 18 may generate an arbitrary lane at a symmetrical location using the detected lane display line 1100b and a virtual center line 1050 generated from the center point b of the road, interpolate covered areas 1100a-1 and 1100a-2 of the lane 1100a.

Through the above process, the curve fitting unit 18 in the present embodiment interpolates the area partially covered by the vehicle according to the curve of the road by using the opposite lane and the center line which are partially covered by the vehicle, and may more accurately provide the lane information to the user.

The display unit 19 displays the curve-fitted curve through the above process, according to a predetermined user interface.

The display unit 19 may directly display the curve-fitted curve or display the curve-fitted curve through an in-vehicle display device.

For example, when the electronic device 10 is a navigation device, since the electronic device 10 includes a display device for guiding a route, and therefore may more clearly display, to the user, the currently driving lane as the curve-fitted curve.

However, the curve-fitted curve according to the present disclosure needs to be more realistically provided to the user as the information for the driving assistance of the user in addition to the simple route guidance, and therefore may be provided using the external display device.

In more detail, the external display device may be a head up display (HUD) or an augmented reality (AR) device.

In the case of the HUD device, the image is reflected on a windshield of a vehicle, and a vehicle driver may obtain information by checking the image reflected on the windshield. In this case, the display unit 19 may display the curve-fitted curve to the image displayed by the HUD and provide the driving guidance information to the driver according to the displayed curve-fitted curve.

Therefore, the user may check the image displayed while watching the front without having to move his/her eyes while driving, and may receive a guide message together when the possibility of the departure of the lane displayed by the curve occurs.

Alternatively, an augmented reality device may be used to provide more detailed information.

The augmented reality device may provide a virtual image by superimposing the virtual image on the front image obtained through the camera.

In general, the driving guidance using the augmented reality may add a display element corresponding to the driving state of the vehicle to the ground area of the driving image to express the driving states such as warning, caution, notice, and the like.

As the display element for expressing the driving state, at least one of a color and a pattern may be applied. The driving states (for example, a general driving state, an overspeed driving state, a caution section entry state, and a GPS shaded section entry state) may be separately defined in advance, and the ground area may be expressed as a visual element suitable for each driving state to match characteristics of the color.

In detail, the display unit 19 may display the curve-fitted curve by superimposing the curve-fitted curve on the lane in the image. Therefore, the user may intuitively be provided with the driving guidance information related to the lane through the curve displayed by being superimposed on the lane in which the user is driving.

Hereinafter, the method for displaying a curve through the lane detection of the images for each distance of the electronic device 10 according to the embodiment of the present disclosure will be described with reference to FIG. 2.

Figure 2:
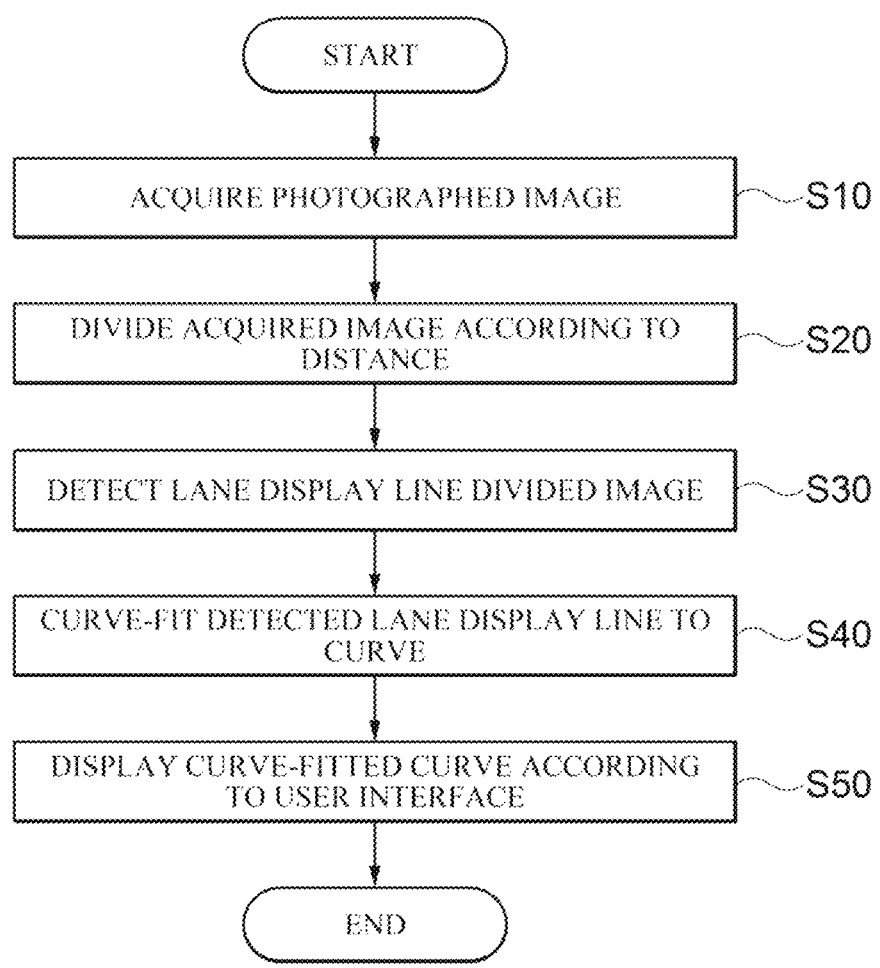
FIG. 2 is a flowchart of a method for displaying lane information according to an embodiment of the present disclosure.

FIG. 2 is a flowchart of a method for displaying a curve according to an embodiment of the present disclosure.

Referring to FIG. 2, the image acquisition unit 12 of the electronic device 10 acquires an image photographed while a vehicle is driving (S10). When the image is acquired, the image division unit 14 divides the acquired image according to a distance from the vehicle (S20).

In this case, in the dividing step S20, the input image may be divided based on a resolution determined according to the distance. As described above, the partial image may be divided according to the distance, but the divided images may be divided into different sizes (resolutions).

Figure 6:
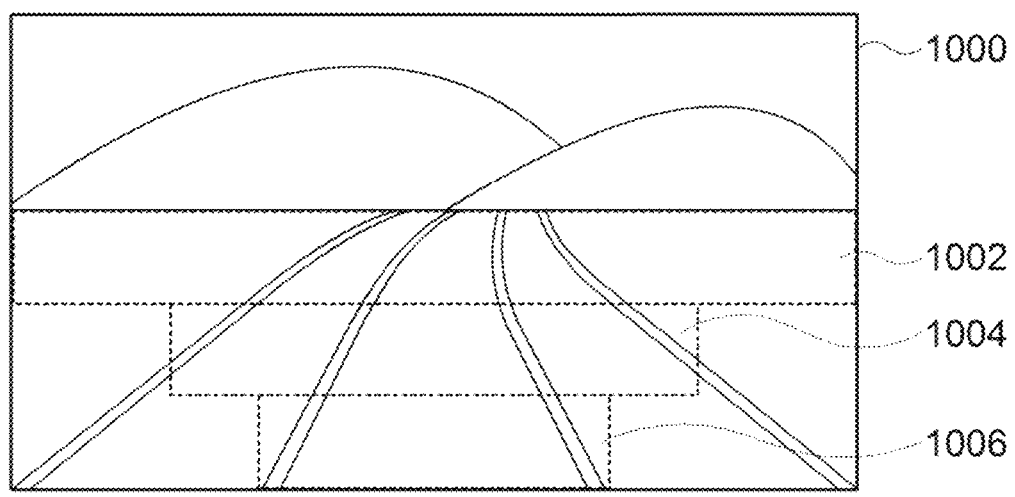

Referring to FIG. 6, in the dividing step S20, the front image 100 may be divided for each distance, but may be set so that the longer the distance from the vehicle, the larger the size of the partial image.

That is, the short-distance partial image 1006 may be set to have a small size so as to detect the display line of the currently driving lane, and the middle-distance partial image 1004 and the long-distance partial image 1002 may be set to have a large size so as to detect not only the currently driving lane but also the display lines of the plurality of other lanes.

In detail, since a size of a vertical axis of the partial image may be determined according to the distance d as described above as the criterion for dividing the image, a size of a horizontal axis thereof may increase as the distance increases, so that the plurality of lanes may be detected for the long distance.

For example, the closest partial image 1006 may set a horizontal width to be 320 pixels, and the middle distance partial image 1004 may set the horizontal width to be the same pixel as or a larger pixel than the short distance. The long-distance partial image 1002 may set the horizontal width to be the size of the acquired original image.

The dividing step through the above process generates the partial images each divided into the set size.

The lane detection unit 16 detects the lanes in the divided image (S30).

The detecting of the lane (S30) may detect the lanes existing in each divided image, and specifically, may detect a lane display line displaying a lane through the image processing.

Figure 7:
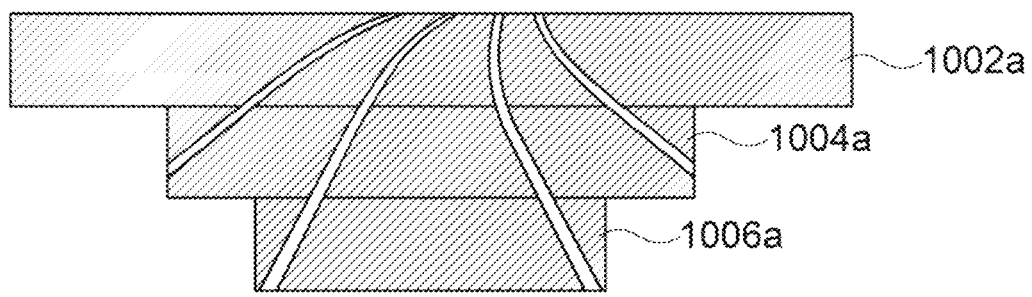
FIGS. 7 to 8C are exemplary views illustrating a lane detection process in the method for displaying lane information according to the embodiment of the present disclosure.

Referring to FIG. 7, the lane detected in the image divided in FIG. 6 may be represented as shown in FIG. 7. The driving lane may be mainly detected in the short-distance image 1006a, and the current driving lane, some side lanes can be detected in the middle-distance partial image 1004a, and the entire lanes including the driving lane may be detected together in the long-distance partial image 1002a.

In this case, since the detected lane display lines are detected in each of the divided images, additional processing may be required to display one continuous lane.

Therefore, in the present embodiment, the curve fitting unit 18 curve-fits the detected lane display lines to a continuous curve (S40).

Referring to FIG. 8, the detected lane display line may be generated as the continuous lane by being curve-fitted to a reference curve derived based on the length and curvature information of the lanes detected in each image.

In addition, the reference curve used for curve fitting may be generated based on the curvature and length information of the road corresponding to the location information on which the vehicle is currently driving, and the lane information 1100 of the road may be acquired in the front image 1000*a* of the driving vehicle by curve-fitting each lane detected on the reference curve.

The display unit 19 displays the curve-fitted curve according to the predetermined user interface (S50).

In the displaying (S50), as described above, the image and lanes acquired while driving directly may be displayed on the display device by being superimposed with each other, or the lane information may be additionally provided through the HUD device and the like so that the user may acquire the guide information required for the driving.

In addition, the electronic device 10 according to the present embodiment may configure a module that provides the guidance information by determining whether the driver is out of the lane through the additionally detected lane display line.

That is, the driver may provide the warning depending on whether the driver is out of the lane through the curve detected and curve-fitted through the divided image.

The electronic device 10 according to the present embodiment may determine whether the vehicle is out of the lane based on the lane information acquired in the curve-fitting step.

Here, the electronic device 10 may determine whether the vehicle is out of the lane based on the location in the image of the lane display line of the lane in which the vehicle is driving and the relative distance (side distance) of the vehicle which is driving.

Figure 9:
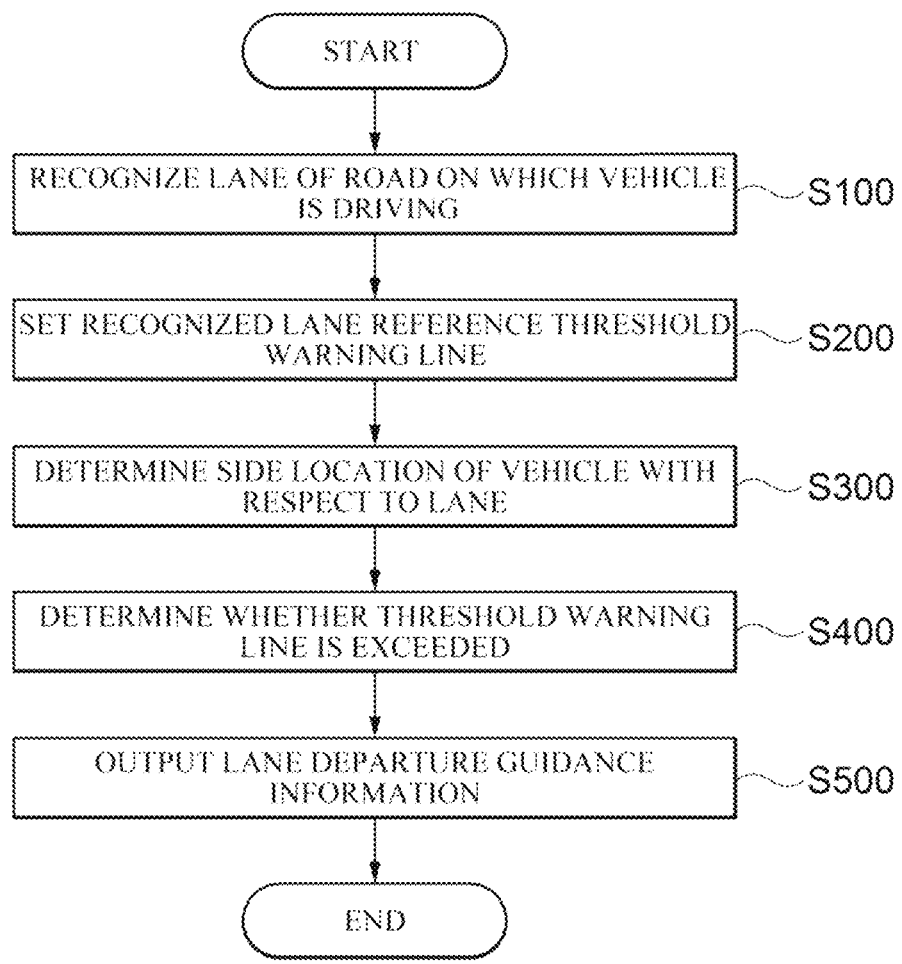
FIG. 9 is a flowchart illustrating a method for guiding a lane departure according to an embodiment of the present disclosure.

Referring to FIG. 9, the electronic device 10 according to the embodiment of the present disclosure may determine whether the vehicle is out of the lane by using the virtual reference line set based on the detected lane display line information and provide the warning accordingly.

In more detail, the electronic device 10 may recognize the lane of the road on which the vehicle is driving through the detected lane display line according to the above-described embodiment (S100).

When the lane of the road is recognized, a side threshold line of a predetermined distance may be generated based on the recognized lane.

Figure 10:
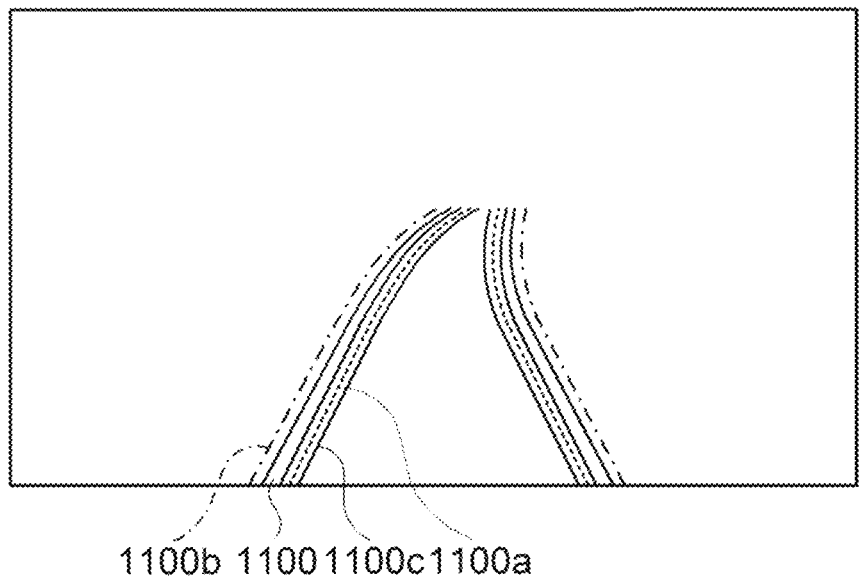
FIG. 10 is an exemplary view illustrating setting of a threshold value of the method for guiding a lane departure according to the embodiment of the present disclosure.

Referring to FIG. 10, in the present embodiment, in order to determine whether the vehicle is out of the lane, the electronic device 10 may set an earliest warning line 1100*c* to be located at the innermost side and a latest warning line 1100*b* to be located at the outermost side with respect to the detected lane display line 1100.

In more detail, the earliest warning line 1100*c* and the latest warning line 1100*b* may be arbitrarily set to be lines having a predetermined lateral spacing based on the detected lane display line 1100. For example, the distance between the earliest warning line 1100*c* and the latest warning line 1100*b* may be determined based on the speed of the vehicle, the width of the lane, the number of lanes, and the like.

Through the above process, a warning section is formed between the earliest warning line 1100*c* and the latest warning line 1100*b*, and the threshold warning line 1100*a* for the actual lane departure warning may be set in the warning section.

When the threshold warning line 1100*a* is set, the location of the side of the vehicle relative to the lane is determined, and it is determined whether the vehicle invades the threshold warning line 1100*a* while the vehicle is driving.

As a result of the determination, when the vehicle invades the set threshold warning line 1100*a*, the electronic device 10 may provide a driver with guidance information according to the lane departure.

In addition, in the present embodiment, the threshold warning line 1100*a* may be changed according to a curvature and a curve radius based on the detected lane display line information.

For example, when the vehicle is driving a sharp curve, the threshold warning line 1100*a* may be further extended to provide the warning information in consideration of a curve cutting behavior of a driver when the vehicle is driving the curve section.

The curve cutting operation refers to an operation of the driver which reduces the influence of the lateral acceleration generated by the centrifugal force when the driver drives the curve and drives the vehicle at the curvature smaller than the curvature of the actual road.

For example, the driver may drive from a far side to a near side with respect to the center of the curve even in the lane when entering the curve, and may drive from a near side to a far side when entering the curve.

Therefore, in the sharp curve, even if the driver drives the vehicle closer to the lane in the center direction of the curve, the threshold warning line 1100*a* may be extended to determine that the vehicle is in normal driving and not to provide the warning due to the lane departure.

According to the present disclosure, it is possible to improve the route visibility to the driver by recognizing the long-distance lane by determining whether the vehicle is in the driving lane. In addition, it is possible to more accurately provide the route guidance information by using the real-time lane recognition results for the display of the route guidance through the augmented reality (AR).

In addition, it is possible to increase the speed and accuracy of the lane detection by determining whether the vehicle is in the driving lane and flexibly detecting the lane to the long distance. In addition, it is possible to divide the area in the image where the lane exists into three parts of a long distance, a medium distance, and a short distance, and to detect and use a finer curve with different resolution.

Meanwhile, the electronic device 10 may be implemented as one module of the advanced driver assistance system (ADAS) or the system 100 for autonomous driving to perform the lane guidance function. This will be described in more detail with reference to FIGS. 11 to 13.

Figure 11:
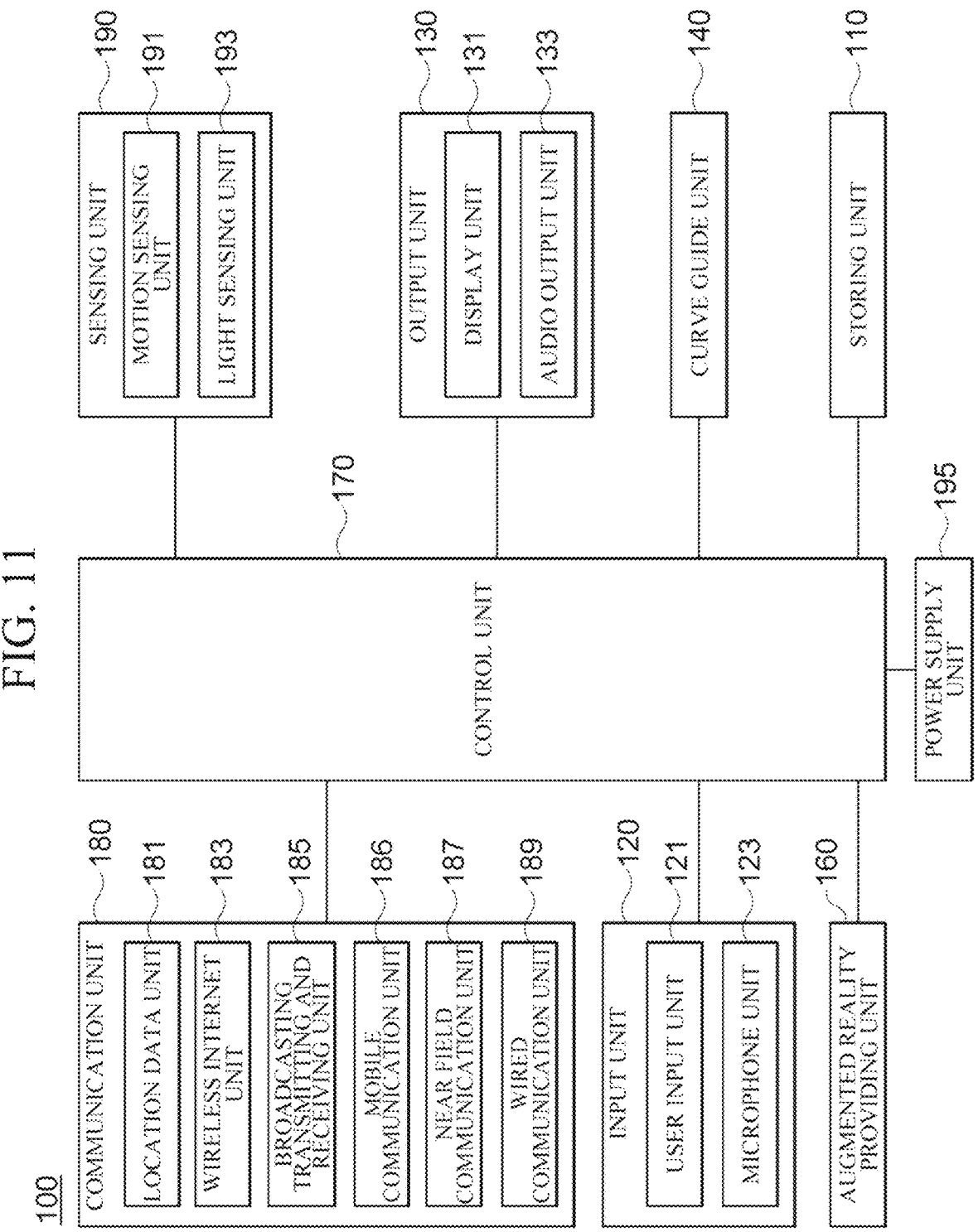
FIG. 11 is a block diagram illustrating a system according to an embodiment of the present disclosure.

FIG. 11 is a block diagram illustrating a system according to an embodiment of the present disclosure. Referring to FIG. 11, the system 100 includes all or a part of a storage unit 110, an input unit 120, an output unit 130, a curve guide unit 140, an augmented reality providing unit 160, a control unit 170, a communication unit 180, a sensing unit 190, and the power supply unit 195.

Here, the system 100 may be implemented as various devices such as a smart phone, a tablet computer, a notebook computer, a personal digital assistant (PDA), a portable multimedia player (PMP), a smart glass, a project glass, a navigation, a car dash cam or a car video recorder which is a video photographing device for a vehicle, and the like, and may be provided in a vehicle.

Driving related guidance may include various guides to assist driving of a vehicle driver such as route guidance, lane departure guidance, lane keeping guidance, front vehicle departure guidance, traffic light change guidance, front vehicle collision prevention guidance, lane change guidance, lane guidance, and curve guidance.

Here, the route guidance may include augmented reality route guidance which performs the route guidance by combining a variety of information such as a location and direction of a user with an image obtained by photographing the front of the driving vehicle and a 2-dimensional (2D) or 3-dimensional (3D) route guidance which performs the route guidance by combining a variety of information such as the location and direction of the user with 2-dimensional or 3-dimensional map data.

In addition, the route guidance may include an aerial map route guide that performs the route guidance by combining a variety of information such as the location and the direction of the user with aerial map data. Here, the route guidance may be interpreted as a concept including not only the case where the user gets in a vehicle and drives the vehicle but also the route guidance when the user walks or jumps to move.

In addition, the lane departure guidance may guide whether the driving vehicle is out of from the lane.

In addition, the lane keeping guidance may guide a vehicle to return to the lane in which the vehicle is originally driving.

In addition, the front vehicle departure guidance may guide whether the vehicle located in front of the stopping vehicle starts.

In addition, the traffic light change guidance may guide whether or not the signal of the traffic light located in front of the stopping vehicle is changed. For example, in the case where a traffic light is changed to a blue traffic light indicating a start signal in a state where a red traffic light indicating a stop signal is turned on, the traffic light change guidance may guide this.

In addition, in the case where the distance from the vehicle located in front of the stopping or driving vehicle is within a certain distance, the front vehicle collision prevention guidance may guide this so as to prevent the collision with the front vehicle.

In addition, the lane change guidance may guide the change from the lane in which the vehicle is located to another lane in order to guide the route to the destination.

In addition, the lane guidance may guide the lane where the current vehicle is located.

In addition, the curve guidance may guide that the road on which the vehicle will drive after a predetermined time is a curve.

Such driving related images, such as the front image of the vehicle that can provide various guides, may be photographed by a camera mounted on the vehicle or a camera of a smartphone. Here, the camera may be a camera that is formed integrally with the system 100 mounted on the vehicle to photograph the front of the vehicle.

As another example, the camera may be a camera mounted on the vehicle separately from the system 100 to photograph the front of the vehicle. In this case, the camera may be a separate video photographing device for a vehicle mounted toward the front of the vehicle, and when a storage medium that receives a photographed image through wired/wireless communication with the video photographing device for the vehicle mounted separately or stores a photographed image of the video photographing device for the vehicle is inserted in the system 100, the system 100 may receive the photographed image.

Hereinafter, the system 100 according to the embodiment of the present disclosure will be described in more detail based on the above description.

The storage unit 110 functions to store various data and applications necessary for the operation of the system 100. In particular, the storage unit 110 may store data necessary for the operation of the system 100, for example, an OS, a route search application, map data, and the like. In addition, the storage unit 110 may store data generated by the operation of the system 100, for example, the searched route data, the received image, and the like.

The storage unit 110 may be implemented as built-in storage devices such as a random access memory (RAM), a flash memory, a read only memory (ROM), an erasable programmable ROM (EPROM), an electronically erasable and programmable ROM (EEPROM), a register, a hard disk, a removable disk, a memory card, and a universal subscriber identify module (USIM), and removable storage devices such as a USB memory.

The input unit 120 functions to convert a physical input from the outside of the system 100 into a specific electrical signal. Here, the input unit 120 may include all or a part of a user input unit 121 and a microphone unit 123.

The user input unit 121 may receive a user input such as a touch or a push operation. Here, the user input unit 121 may be implemented using at least one of various types of buttons, a touch sensor receiving a touch input, and a proximity sensor receiving an approaching motion.

The microphone unit 123 may receive a user's voice and a sound generated inside and outside a vehicle.

The output unit 130 is a device that outputs data of the system 100 to a user as video and/or audio. Here, the output unit 130 may include all or a part of the display unit 131 and the audio output unit 133.

The display unit 131 is a device for outputting data that can be visually recognized by the user. The display unit 131 may be implemented as a display unit provided on a front surface of a housing of the system 100. In addition, the display unit 131 may be formed integrally with the system 100 to output visual recognition data, and may be installed separately from the system 100 such as a head up display (HUD) to output the visual recognition data.

The audio output unit 133 is a device for outputting data that can be acoustically recognized by the system 100. The audio output unit 133 may be implemented as a speaker that expresses data to be notified to the user of the system 100 as voice.

The curve guide unit 140 may perform the function of the above-described curve guidance. In detail, the curve guide unit 140 may acquire link information corresponding to a road on which the vehicle drives, determine a location at a link of a vehicle at a future time point, and use the determined location and a vehicle speed at a reference time point to determine a risk of a curve section in which the vehicle will drive after a predetermined time.

The augmented reality providing unit 160 may provide an augmented reality view mode. Here, the augmented reality may be a method for providing additional information (for example, a graphic element indicating a point of interest (POI), a graphic element guiding a curve, a variety of additional information for assisting driver's safe driving, and the like) by visually superimposing the additional information on a screen containing a real world at which the user actually looks.

The augmented reality providing unit 160 may include all or a part of a calibration unit, a 3D space generation unit, an object generation unit, and a mapping unit.

The calibration unit may perform a calibration for estimating camera parameters corresponding to the camera from the image photographed by the camera. Here, the camera parameters may include an camera extrinsic parameter and an camera intrinsic parameter as parameters constituting a camera matrix which is information indicating the relationship between a real projection space and photos.

The 3D space generation unit may generate a virtual 3D space based on the image photographed by the camera. In detail, the 3D space generation unit may generate a virtual 3D space by applying the camera parameters estimated by the calibration unit to the 2D photographed image.

The object generation unit may generate objects for guiding in the augmented reality, for example, a route guidance object, a lane change guidance object, a lane departure guidance object, a curve guidance object, and the like.

The mapping unit may map the object generated in the object generation unit to the virtual 3D space generated in the 3D space generation unit. In detail, the mapping unit may determine a location in the virtual 3D space of the object generated in the object generation unit and map the object to the determined location.

Meanwhile, the communication unit 180 may be provided for the system 100 to communicate with other devices. The communication unit 180 may include all or a part of a location data unit 181, a wireless Internet unit 183, a broadcasting transmitting and receiving unit 185, a mobile communication unit 186, a near field communication unit 187, and a wired communication unit 189.

The location data unit 181 is a device that acquires location data through a global navigation satellite system (GNSS). The GNSS refers to a navigation system that can calculate a location of a receiver terminal using radio wave signals received from an artificial satellite. Specific examples of the GNSS include a global positioning system (GPS), Galileo, a global orbiting navigational satellite system (GLONASS), a compass, an Indian regional navigational satellite system (IRNSS), a quasi-zenith satellite system (QZSS), and the like, depending on an operating subject. The location data unit 181 of the system 100 according to the embodiment of the present disclosure may receive location data by receiving a GNSS signal serving in an area where the system 100 is used. Alternatively, the location data unit 181 may acquire location data through communication with a base station or an access point (AP) in addition to the GNSS.

The wireless Internet unit 183 is a device that accesses the wireless Internet and acquires or transmits data. The wireless Internet unit 183 may access the Internet network through various communication protocols defined to transmit and receive wireless data of wireless LAN (WLAN), wireless broadband (Wibro), world interoperability for microwave access (Wimax), and high speed downlink packet access (HSDPA).

The broadcasting transmitting and receiving unit 185 is a device that transmits and receives broadcast signals through various broadcast systems. The broadcast system that can transmit and receive through the broadcasting transmitting and receiving unit 185 may include digital multimedia broadcasting terrestrial (DMBT), digital multimedia broadcasting satellite (DMBS), media forward link only (MediaFLO), digital video broadcast handheld (DVBH), integrated services digital broadcast terrestrial (ISDBT), and the like.

The broadcast signal transmitted and received through the broadcasting transmitting and receiving unit 185 may include traffic data, living data, and the like.

The mobile communication unit 186 may access a mobile communication network according to various mobile communication standards such as 3rd generation (3G), 3rd generation partnership project (3GPP), and long term evolution (LTE) to communicate voice and data.

The near field communication unit 187 is a device for near field communication. As described above, the near field communication unit 187 may communicate via Bluetooth, radio frequency identification (RFID), infrared data association (IrDA), ultra wideBand (UWB), ZigBee, near field communication (NFC), wireless-fidelity (Wi-Fi), and the like.

The wired communication unit 189 is an interface device that can connect the system 100 to other devices by wire. The wired communication unit 189 may be a USB module capable of communicating through a USB port.

The communication unit 180 may communicate with other devices using at least one of the location data unit 181, the wireless Internet unit 183, the broadcasting transmitting and receiving unit 185, the mobile communication unit 186, the near field communication unit 187, and the wired communication unit 189.

For example, when the system 100 does not include a camera function, the system may receive an image photographed by a video photographing device for a vehicle such as a car dash cam or a car video recorder by using at least one of the near field communication unit 187 and the wired communication unit 189.

As another example, in the case of communicating with the plurality of devices, any one of them may communicate with the near field communication unit 187 and the other of them may communicate with the wired communication unit 119.

The sensing unit 190 is a device capable of detecting the current state of the system 100. The sensing unit 190 may include all or part of a motion sensing unit 191 and a light sensing unit 193.

The motion sensing unit 191 may detect motion in the three-dimensional space of the system 100. The motion sensing unit 191 may include a three-axis geomagnetic sensor and a three-axis acceleration sensor. By combining motion data obtained through the motion sensing unit 191 with location data obtained through the location data unit 181, a trajectory of a vehicle to which the system 100 is attached may be more accurately calculated.

The light sensing unit 193 is a device for measuring illuminance around the system 100. The brightness of the display unit 131 may be changed to correspond to the ambient brightness by using the illumination data acquired through the light sensing unit 193.

The power supply unit 195 is a device for supplying power necessary for the operation of the system 100 or the operations of other devices connected to the system 100. The power supply unit 195 may be a device that receives power from an external power source such as a battery or a vehicle built in the system 100. In addition, the power supply unit 195 may be implemented as a wired communication module 119 or a device that is wirelessly supplied according to a form of receiving power.

The control unit 170 controls the overall operation of the system 100. In detail, the control unit 170 may control all or a part of the storage unit 110, the input unit 120, the output unit 130, the curve guide unit 140, the augmented reality providing unit 160, the communication unit 180, the sensing unit 190, and the power supply unit 195.

In particular, the control unit 170 may acquire link information corresponding to a road on which the vehicle will drive later. Here, the link information may be acquired from route guidance data for route guidance to a destination.

For example, when destination information is input through the input unit 120, the control unit 170 may generate the route guide data to the destination using map data previously stored in the storage unit 110. Alternatively, when the destination information is input through the input unit 120, the control unit 170 may transmit a route guide request including at least one of the current location information and the destination information to a server. The route guide data may be received from the server according to the route guide request. In this case, the control unit 170 may acquire the link information corresponding to the road on which the vehicle drives from the route guide data.

In addition, the control unit 170 may acquire the link information based on the generation of the estimated driving route information of the vehicle based on real-time location information of the vehicle.

Meanwhile, the control unit 170 may provide lane guidance information according to the embodiment of the present disclosure. That is, the lane may be detected by dividing the input image, and the lane departure warning information may be provided according to the detected lane display line and the current location of the vehicle. In this case, the control unit 170 may use the determination process of FIGS. 1 to 10 described above.

The control unit 170 may control the output unit 130 to output the lane guidance information according to the determination result. In addition, the control unit 170 can output the lane guidance information according to a risk level by using information such as a curvature, a lane width, and the number of lanes as information on a vehicle speed and a driving lane.

If the lane departure risk is a first risk level, the control unit 170 may control the output unit 130 to output the first lane departure guidance. Here, the first risk level may be a numerical value indicating that the user needs attention.

If the lane departure risk is a second risk level, the control unit 170 may control the output unit 130 to output the second lane departure guidance. Here, the second risk level may be a numerical value indicating that the user needs higher attention (warning).

If the lane departure risk is lower than the first risk level, the control unit 170 may control the output unit 130 not to output the lane departure guidance.

In addition, the control unit 170 may divide the lane departure risk into three or more steps, and may provide the user with the lane departure risk guidance appropriate to the situation at each step.

Meanwhile, the lane departure guidance may be performed in the augmented reality screen. In detail, the augmented reality providing unit 160 may generate a lane departure guide object and map the generated lane departure guide object to a virtual 3D space to generate the augmented reality screen, and the control unit 170 may control the display unit 131 to display the generated augmented reality screen.

Figure 12:
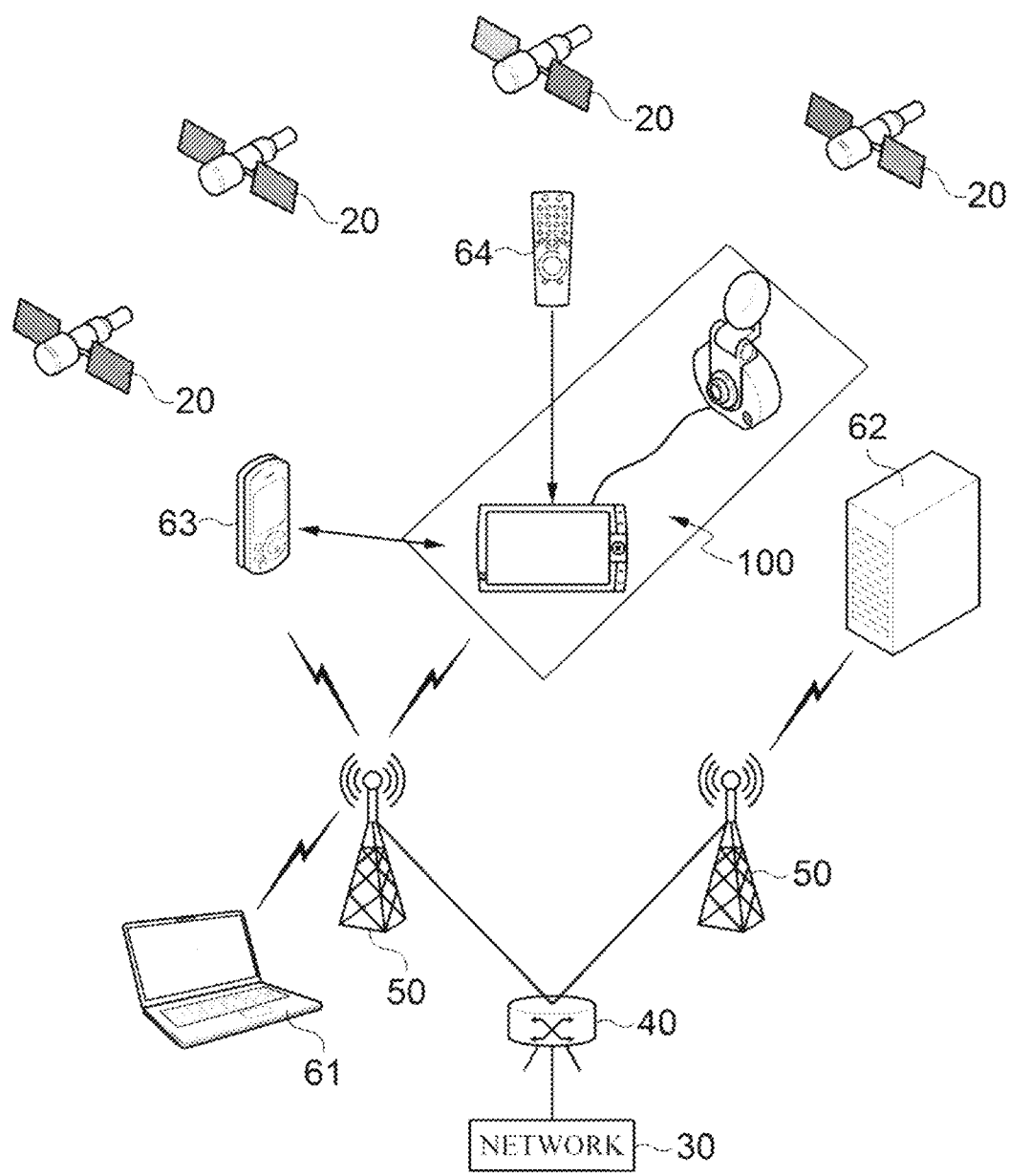
FIG. 12 is a diagram for describing a system network connected to the system according to the embodiment of the present disclosure.

FIG. 12 is a diagram for describing a system network connected to the system according to the embodiment of the present disclosure. Referring to FIG. 12, the system 100 according to the embodiment of the present disclosure may be implemented by various devices provided in a vehicle such as the navigation, the video photographing device for the vehicle, the smartphone, or other augmented reality interface providing other devices for a vehicle, and may access various communication networks and other electronic devices 61 to 64.

In addition, the system 100 may calculate the current location and the current time zone by interlocking a GPS module according to the radio wave signals received from the artificial satellite 20.

Each artificial satellite 20 may transmit an L-band frequency having different frequency bands. The system 100 may calculate the current location based on the time when it takes for the L-band frequency transmitted from each artificial satellite 20 to reach the system 100.

Meanwhile, the system 100 may wirelessly access the network 30 through a control station (ACR) 40, a base station (RAS) 50, an access point (AP), and the like through the communication unit 180. When the system 100 accesses the network 30, data can be exchanged by indirectly accessing other electronic devices 61 and 62 connected to the network 30.

Meanwhile, the system 100 may indirectly access the network 30 through another device 63 having a communication function. For example, when the system 100 is not provided with a module that can connect to the network 30, the system 100 may communicate with another device 63 having a communication function through a near field communication module or the like.

Figure 13:
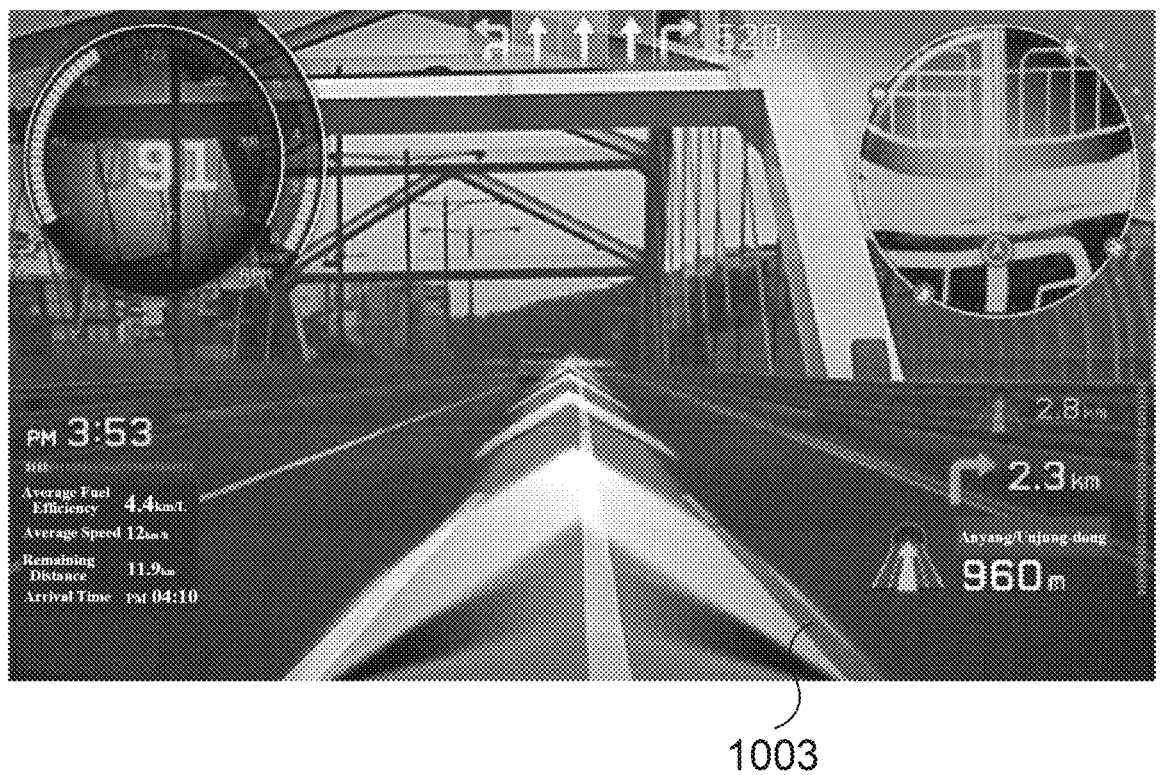
FIG. 13 is a diagram illustrating a lane departure guidance screen of the system according to the embodiment of the present disclosure.

FIG. 13 is a diagram illustrating a lane departure guidance screen of the system according to the embodiment of the present disclosure. Referring to FIG. 13, the system 100 may generate a guide object indicating a risk of lane departure, and output the generated guide object 1003 through the augmented reality.

Here, the guide object 1003 may be an object for guiding the state in which the user needs attention. That is, the lane departure guidance may be an attention guidance for notifying the danger that the vehicle is out of from the lane. In the present embodiment, the guide object 1003 may be implemented as a texture image and expressed through the augmented reality. Accordingly, a driver can easily recognize a road on which a host vehicle is driving.

In addition, the system 100 may also output the guide object 1003 through voice.

Figure 14:
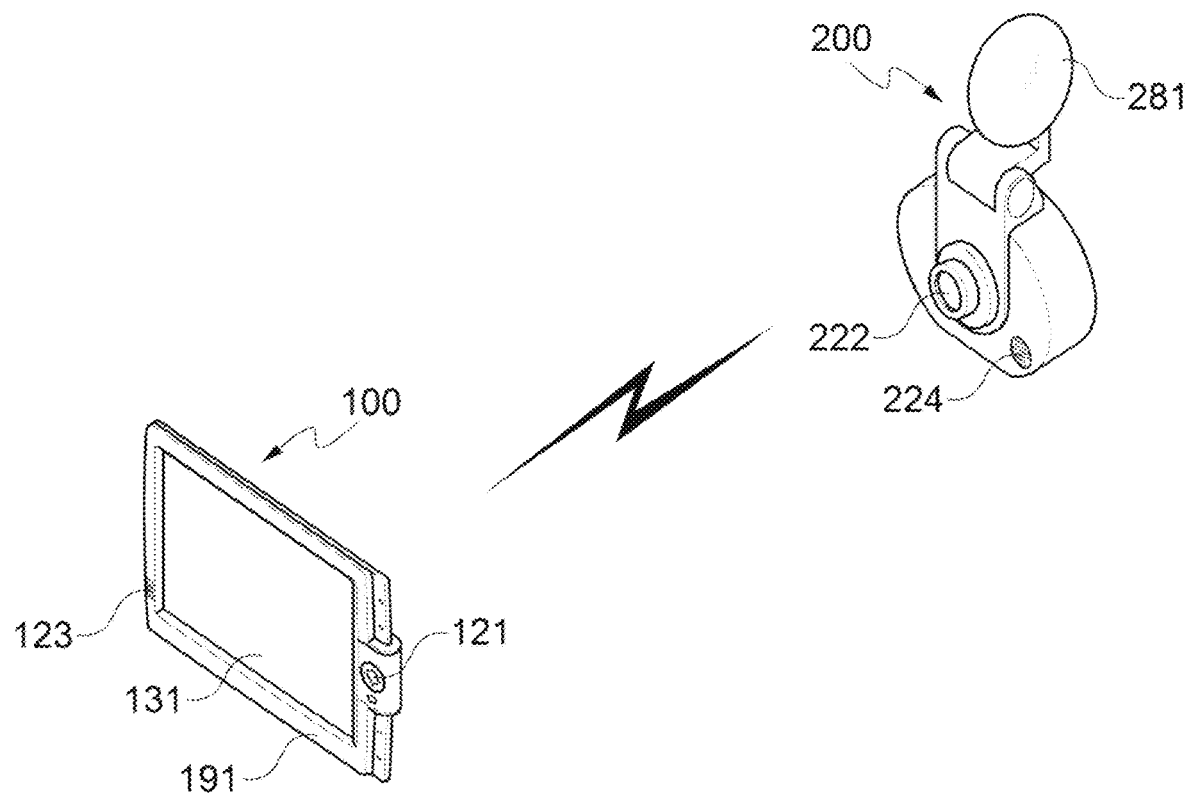
FIG. 14 is a diagram illustrating an implementation form when the system according to an embodiment of the present disclosure does not include a photographing unit.

FIG. 14 is a diagram illustrating an implementation form when the system according to the embodiment of the present disclosure does not include a photographing unit. Referring to FIG. 14, a video photographing device 200 for a vehicle separately provided from the system 100 for a vehicle may configure a system according to an embodiment of the present disclosure using a wired/wireless communication scheme.

The system 100 for the vehicle may include the display unit 131 provided on a front surface of the housing, the user input unit 121, and the microphone 123.

The video photographing device 200 for the vehicle may include a camera 222, a microphone 224, and an attachment unit 281.

Figure 15:
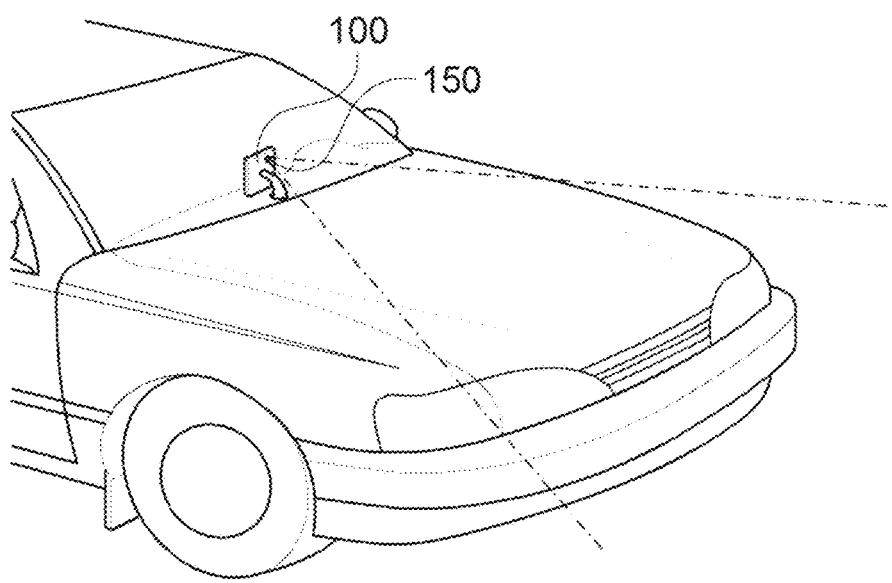
FIG. 15 is a diagram illustrating the implementation form when the system according to the embodiment of the present disclosure includes a photographing unit.

FIG. 15 is a diagram illustrating the implementation form when the system according to the embodiment of the present disclosure includes the photographing unit. Referring to FIG. 15, when the system 100 includes the photographing unit 150, the system may be a device which allows a user to photograph the front of the vehicle by the photographing unit 150 of the system 100 and recognize the display portion of the system 100. Accordingly, the system according to the embodiment of the present disclosure may be implemented.

Figure 16:
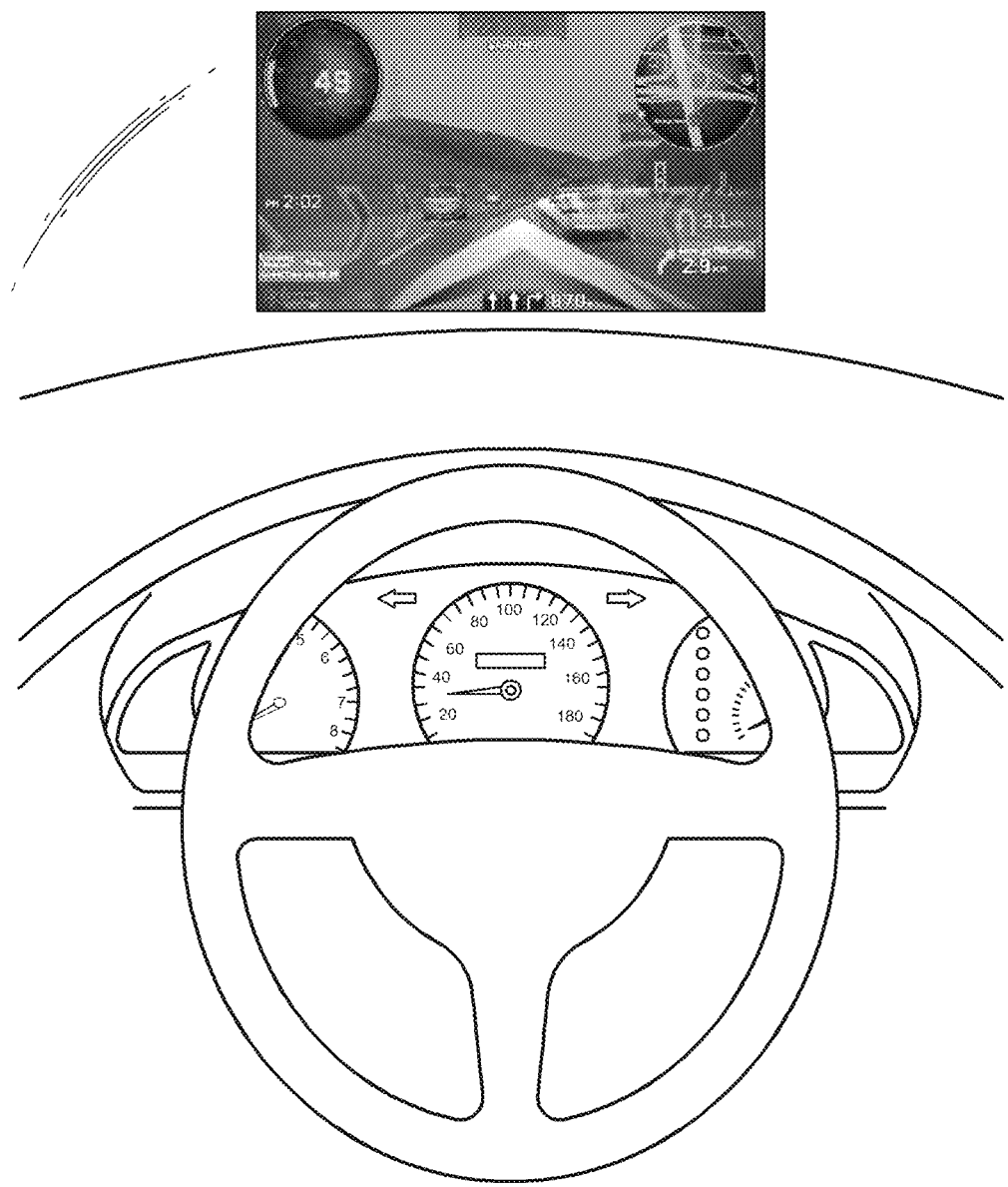
FIG. 16 is a diagram illustrating an implementation form using a head-up display (HUD) according to an embodiment of the present disclosure.

FIG. 16 is a diagram illustrating an implementation form using a head-up display (HUD) according to an embodiment of the present disclosure. Referring to FIG. 16, the HUD may display the augmented reality guide screen on the HUD through wired/wireless communication with other devices.

For example, the augmented reality may be provided through a HUD using a vehicle windshield or an image overlay and the like using a separate image output device, and the augmented reality providing unit 160 may generate the reality image, the interface image overlaid on glass, or the like. In this way, the augmented reality navigation or the vehicle infotainment system may be implemented.

Meanwhile, the curve guide method according to various embodiments of the present disclosure described above may be implemented as a program and provided to a server or devices. Accordingly, each device can access the server or device where the program is stored and download the program.

Meanwhile, in another embodiment, the method for displaying lane information or the method for guiding a lane departure according to the present disclosure may be configured as a module in a control device 2100 of an autonomous vehicle 2000. That is, a memory 2122 and a processor 2124 of the control device 2100 may implement the method for displaying lane information or the method for guiding a lane departure according to the present disclosure in software.

This will be described in more detail with reference to FIG. 17.

Figure 17:
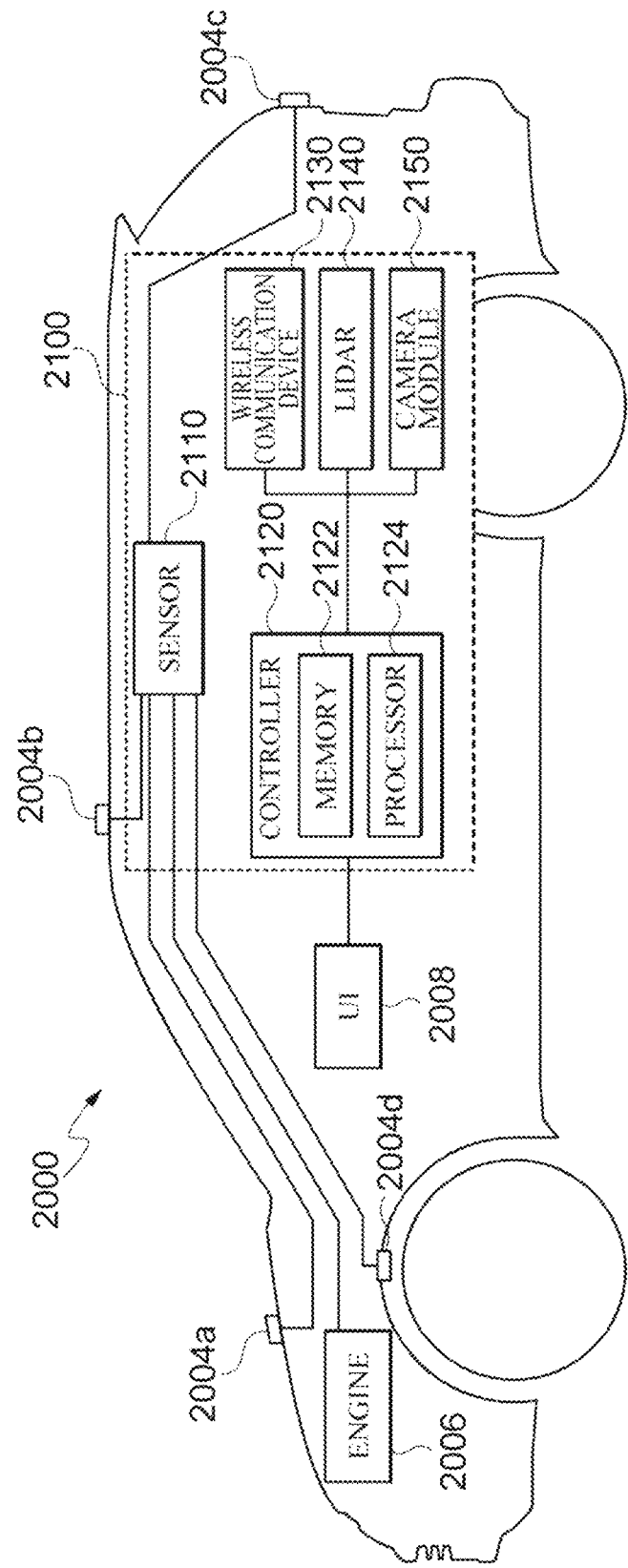
FIG. 17 is a block diagram illustrating an autonomous vehicle according to an embodiment of the present disclosure.

FIG. 17 is a block diagram illustrating a configuration of an autonomous vehicle 2000 according to an embodiment of the present disclosure.

Referring to FIG. 17, the autonomous vehicle 2000 according to the present embodiment may include a control device 2100, sensing modules 2004a, 2004b, 2004c, and 2004d, an engine 2006, and a user interface 2008.

In the present embodiment, the control device 2100 includes a controller 2120 including the memory 2122 and the processor 2124, a sensor 2110, a wireless communication device 2130, a LIDAR 2140, and a camera module 2150.

In this embodiment, the controller 2120 may be additionally configured at the time of manufacturing by a manufacturer of a vehicle or may be further configured to perform a function of autonomous driving after the manufacturing. Alternatively, a configuration for performing continuous additional functions may be included through an upgrade of the controller 2120 configured at the time of manufacturing.

The controller 2120 may transmit a control signal to the sensor 2110, the engine 2006, the user interface 2008, the wireless communication device 2130, the LIDAR 2140, and the camera module 2150 included as other components in the vehicle. In addition, although not shown, the control signal may also be transmitted to an acceleration device, a braking system, a steering device, or a navigation device related to the driving of the vehicle.

In the present embodiment, the controller 2120 may control the engine 2006 and, for example, may detect a speed limit of a road on which the autonomous vehicle 2000 is driving and may control the engine 2006 so that a driving speed does not exceed the limit speed or control the engine 2006 to accelerate the driving speed of the autonomous vehicle 2000 within the range in which the driving speed does not exceed the limit speed. In addition, when the sensing modules 2004a, 2004b, 2004c, and 2004d additionally detect the environment outside the vehicle and transmit the detected environment to the sensor 2110, the controller 2120 receives the detected environment to generate a signal controlling the engine 2006 or the steering device (not shown), thereby controlling the driving of the vehicle.

The controller 2120 may control the engine 2006 or the braking system to decelerate the driving vehicle when other vehicles or obstacles exist in front of the vehicle, and control the trajectory, the driving route, and the steering angle in addition to the speed. Alternatively, the controller 2120 may generate a necessary control signal according to recognition information of external environment such as a driving lane and a driving signal of the vehicle to control the driving of the vehicle.

In addition to generating its own control signal, the controller 2120 may control the driving of the vehicle by performing communication with the surrounding vehicle or the central server and transmitting a command for controlling the peripheral apparatuses through the received information.

In addition, when the location of the camera module 2150 is changed or the angle of view is changed, since it is difficult to accurately recognize a vehicle or a lane according to the present embodiment, the controller 2120 may generate the control signal controlling to perform the calibration of the camera module 2150 to prevent the problem. Therefore, in the present embodiment, the controller 2120 generates a calibration control signal to the camera module 2150, so the normal mounting location, the direction, the angle of view, and the like of the camera module 2150 may be continuously maintained even if the mounting location of the camera module 2150 is changed due to vibrations, shock, or the like generated according to the movement of the autonomous vehicle 2000. The controller 2120 may generate the control signal to perform the calibration of the camera module 2120 when the information on the first mounting location, the direction, and the angle of view of the camera module 2120 which are stored in advance, the information on the first mounting location, the direction, and the angle of view of the camera module 2120 which are measured while the autonomous vehicle 2000 is driving, and the like are different beyond the threshold value.

In the present embodiment, the controller 2120 may include the memory 2122 and the processor 2124. The processor 2124 may execute software stored in the memory 2122 according to the control signal of the controller 2120. Specifically, the controller 2120 may store data and instructions for performing the method for displaying lane information or the method for guiding a lane departure according to the present disclosure in the memory 2122, and execute instructions using the processor 2124 in order to implement one or more methods disclosed herein.

In this case, the memory 2122 may be stored in a recording medium executable by the nonvolatile processor 2124. The memory 2122 may store software and data through appropriate internal and external devices. The memory 2122 may be constituted by a random access memory (RAM), a read only memory (ROM), a hard disk, and a memory 2122 device connected to a dongle.

The memory 2122 may store at least an operating system (OS), a user application, and executable instructions. The memory 2122 may also store application data and array data structures.

The processor 2124 may be a microprocessor or a controller, a microcontroller, or a state machine as a suitable electronic processor.

The processor 2124 may be implemented in a combination of computing devices, and the computing device may be constituted by a digital signal processor, a microprocessor, or an appropriate combination thereof.

In addition, in the present embodiment, the control device 2100 may monitor the inside and outside features of the autonomous vehicle 2000 and detect a state by at least one sensor 2110.

The sensor 2110 may be constituted by at least one sensing module 2004, and the sensing module 2004 may be implemented at a specific position of the autonomous vehicle 2000 according to a sensing purpose. The sensor 2110 may be located at the lower, rear, front, top, or side ends of the autonomous vehicle 2000, and may also be located at an internal part of a vehicle, a tire, or the like.

Through this, the sensing module 2004 may detect information related to driving such as the engine 2006, a tire, a steering angle, a speed, and a weight of a vehicle as the internal information of the vehicle. In addition, at least one sensing module 2004 may include an acceleration sensor 2110, a gyroscope, an image sensor 2110, a RADAR, an ultrasonic sensor, a LiDAR sensor, and the like, and may detect the motion information of the autonomous vehicle 2000.

The sensing module 2004 can receive specific data regarding external environmental conditions such as state information of a road on which the autonomous vehicle is located, surrounding vehicle information, and weather, as the external information, and detect the vehicle parameters based on the received data. The detected information may be stored in the memory 2122 depending on the purpose, either temporarily or in the long term.

In the present embodiment, the sensor 2110 may integrate and collect the information of the sensing modules 2004 for collecting information generated from the inside and outside of the autonomous vehicle 2000.

The control device 2100 may further include a wireless communication device 2130.

The wireless communication device 2130 is configured to implement wireless communication between the autonomous vehicles 2000. For example, the autonomous vehicle 2000 may communicate with a user's mobile phone, other wireless communication device 2130, other vehicles, a central device (traffic control device), a server, and the like. The wireless communication device 2130 may transmit and receive a wireless signal according to an access wireless protocol. The wireless communication protocol may be Wi-Fi, Bluetooth, long-term evolution (LTE), code division multiple access (CDMA), wideband code division multiple access (WCDMA), global systems for mobile communications (GSM), and is not limited thereto.

In addition, in the present embodiment, the autonomous vehicle 2000 can implement vehicle-to-vehicle communication through the wireless communication device 2130. That is, the wireless communication device 2130 may communicate with other vehicles on a road and other vehicles through the vehicle-to-vehicle (V2V) communication. The autonomous vehicle 2000 may transmit and receive information such as driving warning and traffic information through the vehicle-to-vehicle communication, and may request information to other vehicles or receive a request from other vehicles. For example, the wireless communication device 2130 may perform V2V communication by a dedicated short-range communication (DSRC) device or a cellular-V2V (C-V2V) device. In addition to the vehicle-to-vehicle communication, vehicle to everything communication (V2X) between a vehicle and other objects (for example, an electronic device or the like which is carried by a pedestrian) may also be implemented through the wireless communication device 2130.

In addition, the control device 2100 may include a LIDAR device 2140. The LIDAR device 2140 may detect objects around the autonomous vehicle 2000 during operation using data sensed by the LIDAR sensor. The LIDAR device 2140 may transmit the detected information to the controller 2120, and the controller 2120 may operate the autonomous vehicle 2000 according to the detection information. For example, the controller 2120 may instruct the vehicle to reduce the speed through the engine 2006 when there is a front vehicle driving at a low speed in the detection information. Alternatively, the controller may instruct a vehicle to reduce an entry speed according to a curvature of a curve which the vehicle enters.

The control device 2100 may further include a camera module 2150. The controller 2120 may extract object information from the external image photographed by the camera module 2150 and the controller 2120 may process the extracted object information.

In addition, the control device 2100 may further include imaging devices for recognizing the external environment. In addition to the LIDAR 2140, a RADAR, a GPS device, an odometry, and other computer vision devices may be used, and these devices may be selected or simultaneously operated as needed to enable more precise sensing.

The autonomous vehicle 2000 may further include a user interface 2008 for an input of a user to the above-described control device 2100. The user interface 2008 may allow a user to input information with appropriate interactions. For example, the user interface 2008 may be implemented as a touch screen, a keypad, an operation button, or the like. The user interface 2008 may transmit an input or a command to the controller 2120, and the controller 2120 may perform a control operation of the vehicle in response to the input or the command.

In addition, the user interface 2008 may allow a device outside the autonomous vehicle 2000 to communicate with the autonomous vehicle 2000 through the wireless communication device 2130. For example, the user interface 2008 may be interlocked with a mobile phone, a tablet, or other computer devices.

Furthermore, although the autonomous vehicle 2000 has been described as including the engine 2006 in this embodiment, the autonomous vehicle 2000 can also include other types of propulsion systems. For example, the vehicle may be driven by electrical energy and may be driven through hydrogen energy or a hybrid system combining them. Accordingly, the controller 2120 may include a propulsion mechanism according to the propulsion system of the autonomous vehicle 2000, and may provide a control signal to components of each propulsion mechanism.

Figure 18:
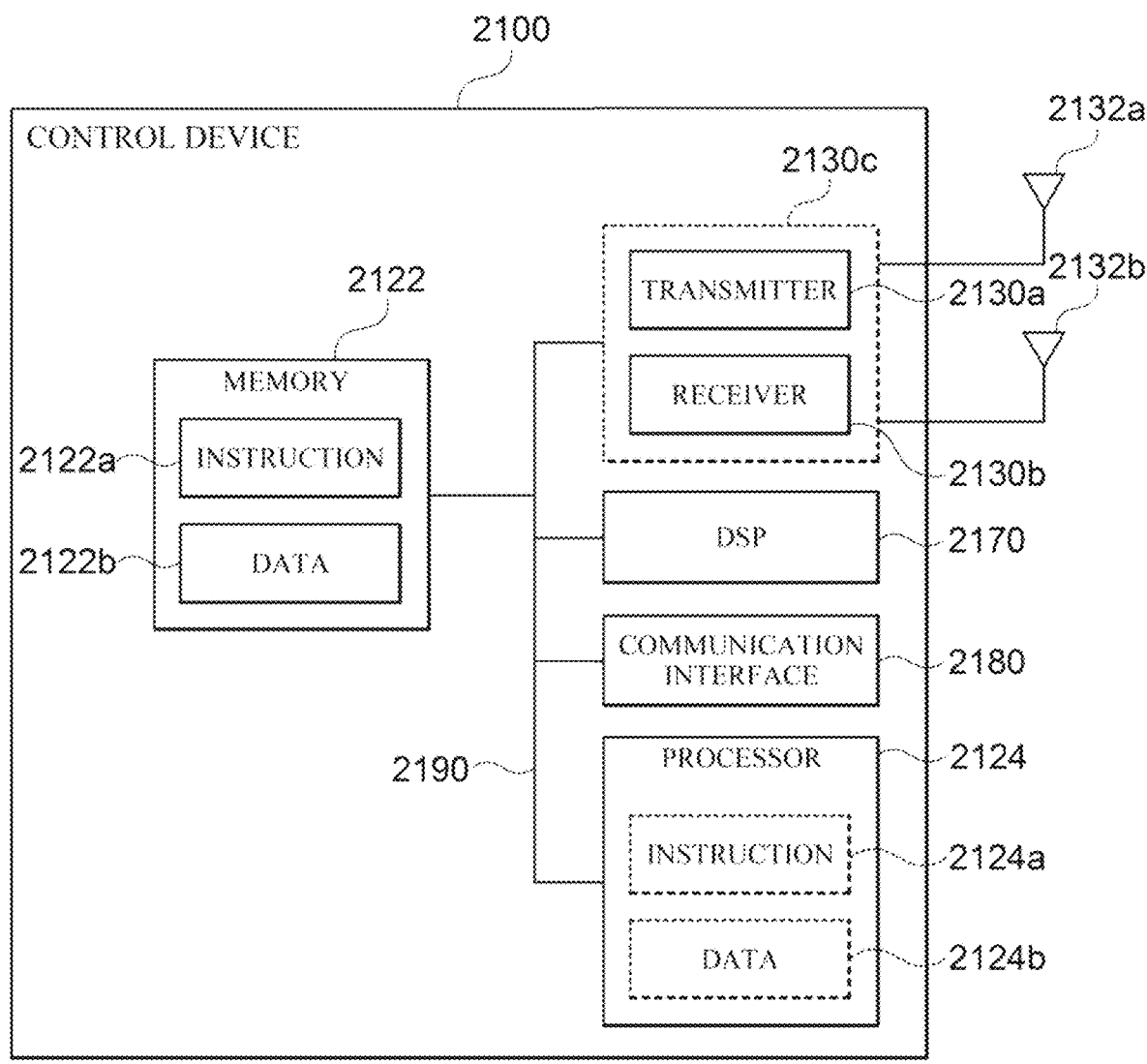
FIG. 18 is a block diagram illustrating a detailed configuration of a control device according to an embodiment of the present disclosure.

Hereinafter, the detailed configuration of the control device 2100 for performing the method for displaying lane information or the method for guiding a lane departure according to the present disclosure will be described in more detail with reference to FIG. 18.

The control device 2100 includes the processor 2124. The processor 2124 may be a general purpose single or multi-chip microprocessor, a dedicated microprocessor, a microcontroller, a programmable gate array, or the like. The processor may be referred to as a central processing unit (CPU). In addition, in the present embodiment, the processor 2124 may be used as a combination of a plurality of processors.

The control device 2100 also includes the memory 2122. The memory 2122 may be any electronic component capable of storing electronic information. The memory 2122 may also include a combination of memories 2122 in addition to a single memory.

Data and instructions 2122a for performing the method for displaying lane information or the method for guiding a lane departure according to the present disclosure may be stored in the memory 2122. When the processor 2124 executes the instructions 2122a, all or a part of the instructions 2122a and the data 2122b required for the execution of the instructions may be loaded 2124a and 2124b onto the processor 2124.

The control device 2100 may include a transmitter 2130a, a receiver 2130b, or a transceiver 2130c to allow transmission and reception of signals. One or more antennas 2132a and 2132b may be electrically connected to a transmitter 2130a, a receiver 2130b, or each transceiver 2130c and may further include antennas.

The control device 2100 may include a digital signal processor (DSP) 2170. The DSP 2170 may allow the vehicle to process digital signals quickly.

The control device 2100 may include a communication interface 2180. The communication interface 2180 may include one or more ports and/or communication modules for connecting other devices with the control device 2100. The communication interface 2180 may enable the user and the control device 2100 to interact.

Various configurations of the control device 2100 may be connected together by one or more buses 2190, and the buses 2190 may include a power bus, a control signal bus, a status signal bus, a data bus, and the like. Under the control of the processor 2124, the components may transmit information to each other through the bus 2190 and perform a desired function.

The devices described hereinabove may be implemented by hardware components, software components, and/or combinations of hardware components and software components. The devices and the components described in the embodiments may be implemented using one or more general purpose computers or special purpose computers such as a processor, a controller, an arithmetic logic unit (ALU), a digital signal processor, a microcomputer, a field programmable gate array (FPGA), a programmable logic unit (PLU), a microprocessor, or any other devices that may execute instructions and respond to the instructions.

A processing device may execute an operating system (OS) and one or more software applications executed on the operating system. In addition, the processing device may access, store, manipulate, process, and generate data in response to execution of software. Although a case in which one processing device is used is described for convenience of understanding, it may be recognized by those skilled in the art that the processing device may include a plurality of processing elements and/or plural types of processing elements. For example, the processing device may include a plurality of processors or one processor and one controller. In addition, other processing configurations such as parallel processors are also possible.

The software may include computer programs, codes, instructions, or a combination of one or more thereof, and may configure the processing device to be operated as desired or independently or collectively command the processing device to be operated as desired. The software and/or the data may be permanently or temporarily embodied in any type of machine, component, physical device, virtual equipment, computer storage medium or device, or transmitted signal wave to be interpreted by the processing device or provide instructions or data to the processing device. The software may be distributed on computer systems connected to each other by a network to be thus stored or executed by a distributed method. The software and the data may be stored in one or more computer-readable recording media.

The methods according to the embodiment may be implemented in a form of program commands that may be executed through various computer means and may be recorded in a computer-readable recording medium. The computer-readable recording medium may include a program command, a data file, a data structure or the like, alone or a combination thereof. The program commands recorded in the computer-readable recording medium may be especially designed and configured for the embodiments or be known to those skilled in a art of computer software. Examples of the computer-readable recording medium may include a magnetic media such as a hard disk, a floppy disk, or a magnetic tape; optical media such as a compact disk read only memory (CD-ROM) or a digital versatile disk (DVD); a magneto-optical media such as a floptical disk; and a hardware device specially configured to store and perform program commands, such as a ROM, a random access memory (RAM), a flash memory, or the like. Examples of the program commands include a high-level language code capable of being executed by a computer using an interpreter, or the like, as well as a machine language code made by a compiler. The abovementioned hardware device may be constituted to be operated as one or more software modules to perform the operations of the embodiments, and vice versa.

The spirit of the present disclosure has been illustratively described hereinabove. It will be appreciated by a person of ordinary skill in the art that various modifications and alterations may be made without departing from the essential characteristics of the present disclosure.

Accordingly, the embodiments disclosed in the present disclosure and the accompanying drawings are not intended to limit the technical spirit of the present disclosure but to explain, and the scope of the technical spirit of the present disclosure is not limited by the embodiments and the accompanying drawings. The scope of the present disclosure should be interpreted by the following claims and it should be interpreted that all spirits equivalent to the following claims fall within the scope of the present disclosure.

What is claimed is:

1. A method for displaying lane information in a vehicle, comprising:
   acquiring an image photographed while the vehicle is driving;
   dividing the acquired image into a plurality of areas based on distance from the vehicle;
   detecting lane display lines in the divided areas;
   curve-fitting the detected lane display lines into a continuous curve;
   configuring a warning system based on the curve-fitted lane display lines, including:
   setting an earliest warning line at the innermost side and a latest warning line at the outermost side with respect to the detected lane display line,
   defining a warning section between the earliest warning line and the latest warning line,
   setting a threshold warning line for actual lane departure notification within the warning section,
   determining a position of the vehicle relative to the lane based on the set threshold warning line, and determining whether the vehicle crosses the threshold warning line during driving based on the determined position; and providing a driver with visual guidance information to assist driving of the vehicle according to whether the lane departure of the vehicle is determined or not, wherein a distance between the earliest warning line and the latest warning line is determined based on the number of lanes.

2. The method of claim 1, wherein the threshold warning line is changed according to a curvature or a curve radius based on the detected lane display lines.

3. The method of claim 1, wherein the earliest warning line or the latest warning line is set having a predetermined lateral distance, based on the detected lane display line.

4. The method of claim 3, wherein the distance between the earliest warning line and the latest warning line, which is determined based on the number of lanes, is further adjusted based on the speed of the vehicle or the width of the lane.

5. The method of claim 3, wherein the threshold warning line is further extended according to a consideration of curve cutting behavior of a driver when the vehicle is driving the curve section.

6. The method of claim 1, further comprising:
displaying a driving route of the vehicle is displayed on the curve-fitted curve.

7. An electronic device, comprising:
a processor configured to acquire an image photographed while a vehicle is driving;
the processor configured to divide the acquired image into a plurality of areas based on distance from the vehicle;
the processor configured to detect lane display lines in the divided image;
the processor configured to curve-fit the detected lane display lines into a continuous curve;
the processor further configured to configure a warning system based on the curve-fitted lane display lines,
wherein the processor is further configured to:
set an earliest warning line at the innermost side and a latest warning line at the outermost side with respect to the detected lane display line,
define a warning section between the earliest warning line and the latest warning line,
set a threshold warning line for actual lane departure notification within the warning section,
determine a position of the vehicle relative to the lane based on the set threshold warning line, and
determine whether the vehicle crosses the threshold warning line during driving based on the determined position; and
a display configured to display a driver with visual guidance information to assist driving of the vehicle according to whether the lane departure of the vehicle is determined or not,
wherein a distance between the earliest warning line and the latest warning line is determined based on the number of lanes.

8. The electronic device of claim 7, wherein the threshold warning line is changed according to a curvature or a curve radius based on the detected lane display lines.

9. The electronic device of claim 7, wherein the earliest warning line or the latest warning line is set having a predetermined lateral distance, based on the detected lane display line.

10. The electronic device of claim 9, wherein the distance between the earliest warning line and the latest warning line, which is determined based on the number of lanes, is further adjusted based on the speed of the vehicle or the width of the lane.

11. The electronic device of claim 9, wherein the threshold warning line is further extended according to a consideration of curve cutting behavior of a driver when the vehicle is driving the curve section.

12. The electronic device of claim 7, wherein the display further configured to display a driving route of the vehicle is displayed on the curve-fitted curve.

* * * * *